Feb. 25, 1941.          R. L. WILSON          2,232,753
CONTROL APPARATUS
Filed March 21, 1940          8 Sheets-Sheet 1

Inventor:
Rosser L. Wilson
By Belt, Wallace and Cannon
Attorneys

Feb. 25, 1941.   R. L. WILSON   2,232,753
CONTROL APPARATUS
Filed March 21, 1940   8 Sheets-Sheet 3
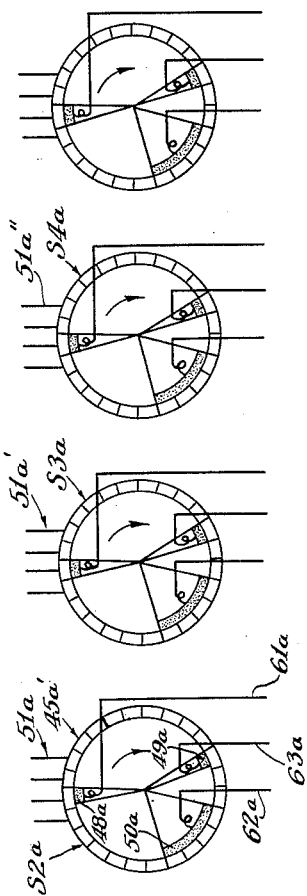
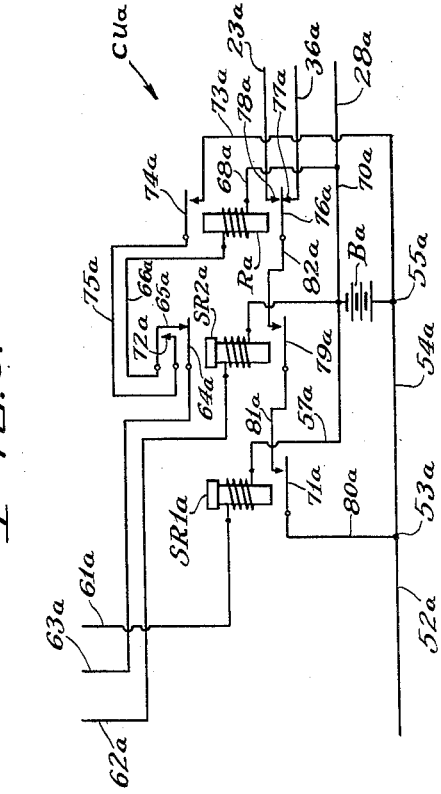
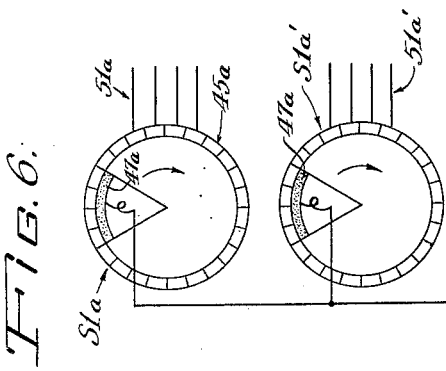
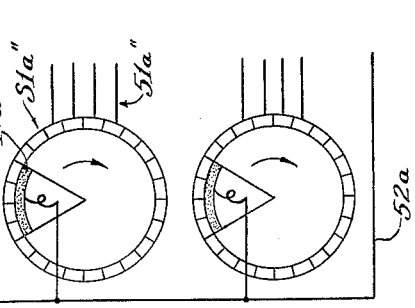
Inventor:
Rosser L. Wilson
By Belt, Wallace and Cannon
Attorneys Feb. 25, 1941.  R. L. WILSON  2,232,753
CONTROL APPARATUS
Filed March 21, 1940  8 Sheets-Sheet 4
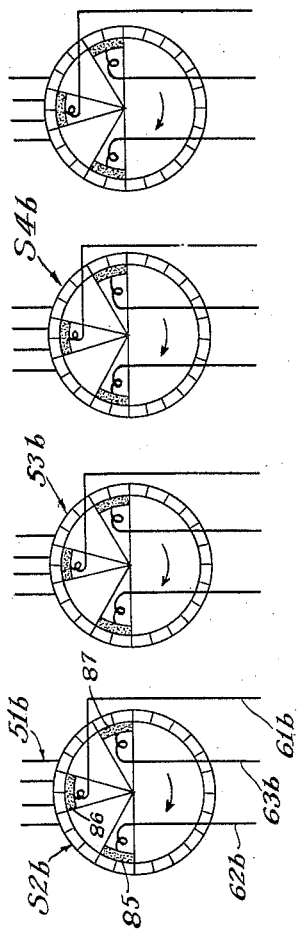
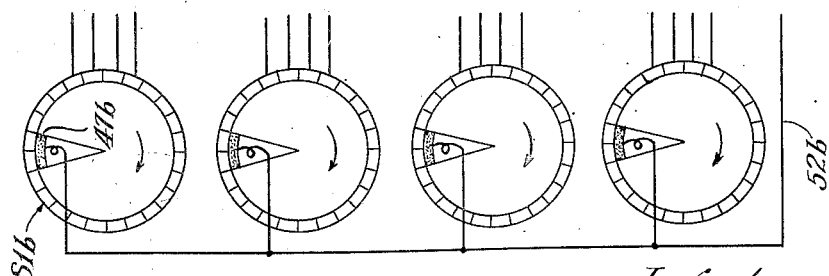
Inventor:
Rosser L. Wilson
By Belt, Wallace and Cannon
Attorneys

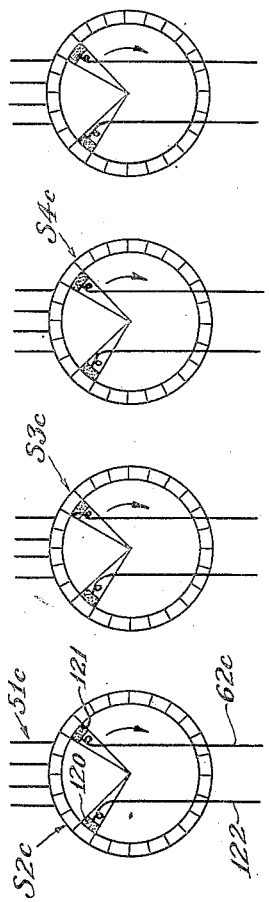
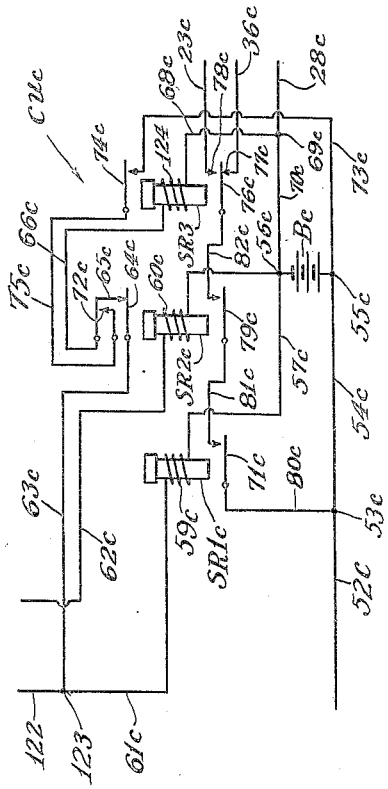
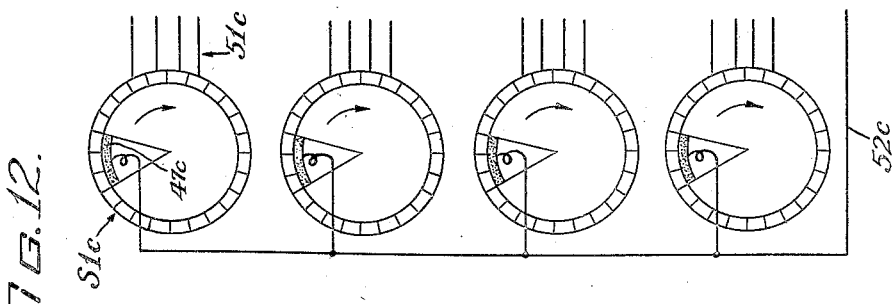

Feb. 25, 1941.                R. L. WILSON                2,232,753
                            CONTROL APPARATUS
                         Filed March 21, 1940          8 Sheets-Sheet 6
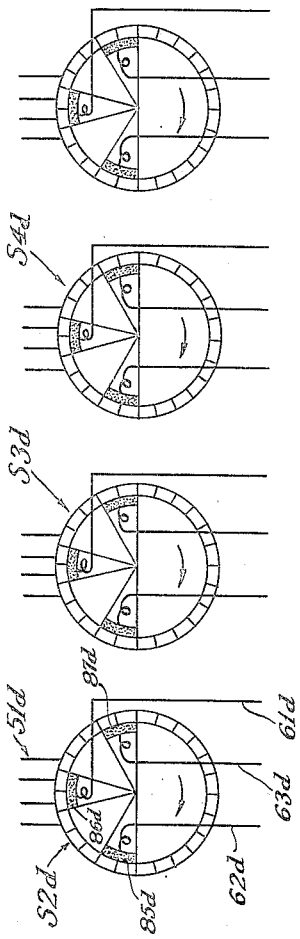
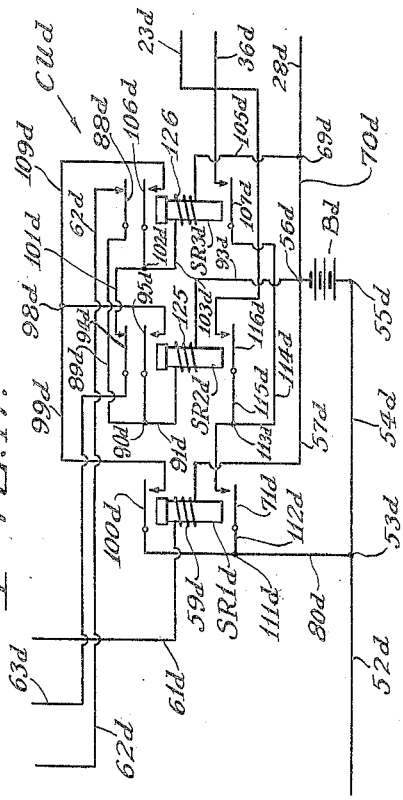
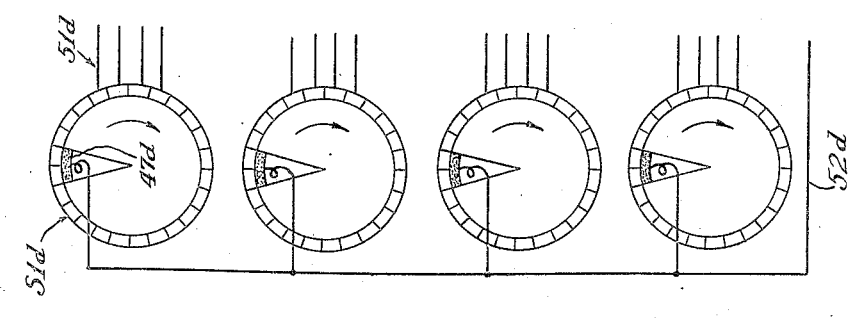
Inventor:
Rosser L. Wilson
By Bell, Wallace and Cannon
Attorneys Inventor:
Rosser L. Wilson
By Belt, Wallace and Cannon
Attorneys Patented Feb. 25, 1941

2,232,753

UNITED STATES PATENT OFFICE 2,232,753

CONTROL APPARATUS

Rosser L. Wilson, Mahwah, N. J., assignor to The American Brake Shoe and Foundry Company, Wilmington, Del., a corporation of Delaware Application March 21, 1940, Serial No. 325,150

12 Claims. (Cl. 170—135.6)

This invention relates to apparatus for controlling the relative speeds of moving parts of machinery, and particularly to such apparatus when used for maintaining a substantially synchronous relation in the rotative speeds of two or more rotating parts such as engine or motor drive shafts and the like.

It is frequently desirable to maintain the drive shafts of two or more engines or the like in substantial synchronism, as where such engines or the like are operated to supply power to a single operative device. Prior control apparatus for so correlating the associated drives on machinery of this character has contemplated setting up opposing mechanical, electromotive, or magnetic forces respectively proportional in magnitude to the rotative speeds of the parts to be synchronized or otherwise correlated, and the unbalancing of such opposing forces has been effective through the medium of devices such as differential governors, synchronous motors, differentially wound relays, or the like, to bring about a control operation of the apparatus.

It is a salient object of the present invention to correlate the operation of two or more engines or like driving means without resorting to the use of detecting apparatus responsive to the interaction of opposing forces.

In the development of aircraft such as airplanes it has been found advantageous in many instances to employ two or more engines, each driving a propeller shaft on the plane or other aircraft. One of the difficulties which has been encountered on aircraft of this kind is that undesirable low-frequency beat vibrations may be set up when the several propeller shafts do not rotate in substantial synchronism with each other, and these beat-frequency vibrations are frequently manifested in various parts of the aircraft structure in the form of concentrated hammering impulses which have a more or less disturbing effect upon the occupants. Moreover, such beat vibrations are likely to appear in locations where they have a detrimental effect, such as in the wings of a plane, and thus they may tend to weaken the aircraft structure.

It has been proposed heretofore to automatically maintain two or more propellers on multi-engined aircraft and the like in substantial synchronism by providing a plurality of generators, each driven by a propeller shaft, and electrically connecting the generators in opposition to each other in a series circuit including an electrically operable means such as a motor which functions in dependence upon the resultant electromotive force in the series circuit to vary the speed of an engine that is to be maintained in timed relation with a master engine. An outstanding disadvantage of such an arrangement is that the generators are comparatively heavy and thus considerable extra weight is added to the aircraft structure. Moreover, it is relatively difficult to design generators of small size whose electrical characteristics will be substantially identical at all speeds within the working range.

In view of the foregoing, it is an object of my invention to accurately control the operation of the propellers in aircraft and the like and to maintain the same in substantial synchronism under all conditions which may be encountered in practice, by the use of apparatus which is of extremely light, simple and inexpensive construction.

A further object is to control engine speed, for example by automatically varying the propeller pitch, through the use of novel means responsive to the relative speeds of the propellers and having a time factor for enabling operation of such pitch-adjusting or other regulating means only upon the establishment of at least a predetermined difference in rotative speeds.

A still further object is to dispense with generators and the like for comparing propeller or propeller shaft speeds (such terms being used synonymously hereinafter) and to employ in lieu thereof electrical contact-making devices, such as commutator switches, which are embodied in a control circuit including timing means, such as slow-to-release relays, that are responsive to said commutator switches for controlling the propeller pitch-adjusting means or other engine speed governing means in dependence upon whether or not there is at least a predetermined discrepancy in propeller speeds, and in accordance with the sense of the relative rotations of the propellers, and in this regard sense of relative rotation is to be understood to mean the direction of rotation of one propeller relative to another or master propeller, or, to state this in an equivalent manner, the rotative speed of the first-named propeller in comparison with the speed of the master propeller. Thus, assuming the direction of rotation of both propellers to be clockwise as viewed from the rear of the aircraft, if the first propeller is rotating more slowly than is the master propeller, then the sense of relative rotation of the first propeller is counterclockwise, because this propeller is rotating clockwise less rapidly than is the master propeller. On the other hand, if the first propeller is rotating more rapidly than is the master propeller, the sense of relative rotation of the first propeller is clockwise, because this propeller is rotating clockwise at a greater speed than is the master propeller. It is in this manner that the just explained term is used hereinafter.

A still further object is to electrically interconnect at least two relatively stationary commutators; to provide each commutator with one or more brushes or other contact-making means rotatively movable relative thereto in response to the rotative speed of a respective one of at least two members which are to be operated in substantial synchronism; to establish energizing circuits through the commutator brushes to electrically operable means such as relays; to condition a selected one of still other energizing circuits to a further electrically operable means for conditioning the same in accordance with the sense of the relative rotations of said members; and to render said relays effective to complete the selected one of the last-named energizing circuits whenever there is at least a predetermined variation in the relative speeds of the brushes of said commutators, said further electrically operated means operating when thus energized in a selected manner to bring one of said rotating members into substantial synchronism with the other or another of such members.

A further object is to provide means of the above described character for detecting the sense of the relative rotation, if any, between two independently rotatable parts of machinery or the like, and to provide further means for ascertaining when the magnitude of such relative rotation exceeds predetermined limits, said means and said further means being effective to control the rotative speed of one of said rotatable machine parts and to substantially synchronize it with the other of such rotating parts when a predetermined difference in rotative speeds arises.

Other and further objects of the present invention will be apparent from the following description and claims and are illustrated in the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings,

Figs. 6, 7 and 8 are diagrammatic views of a modified form of the invention shown in Figs. 4 and 5;

Figs. 9, 10 and 11 are views respectively similar to Figs. 6, 7 and 8 and showing another modified form of my invention;

Figs. 12, 13 and 14 are further views respectively similar to Figs. 6, 7 and 8 and showing still another modified form of my invention;

Figs. 15, 16 and 17 are diagrammatic views of a modification similar to that shown shown in Figs. 9 to 11;

Figure 1:
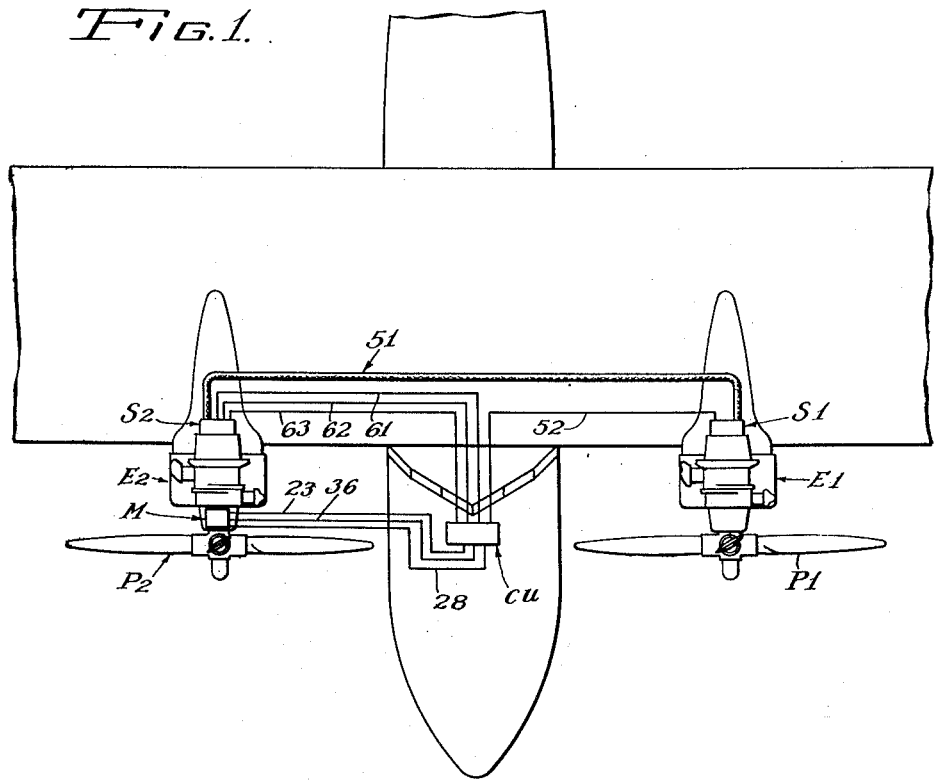
Fig. 1 is a schematic plan view of the nose portion of an airplane showing an embodiment of my invention as used in maintaining a timed relation in the operation of two aircraft engines.

In the form of my invention which is adapted for maintaining a timed relation in the speeds of two or more engines on aircraft and the like, one of the engines, such as E1, driving a propeller as P1, Fig. 1, is selected to be the master engine, and the other engine or engines, such as E2, each driving a propeller as P2, are maintained in substantial synchronism with this master engine by the control apparatus. Briefly, such control apparatus comprises at least one master commutator switch as S1 having rotative parts driven by the master engine E1; another or other commutator switch or switches as S2, each having rotative elements which are driven by a corresponding engine as E2 that is to be operated in timed relation with the master engine E1; a control unit as CU that is governed jointly by a master switch as S1 and by a secondary switch as S2 for each engine as E2 that is to be so timed with respect to the engine E1; and a motor or like means M for each engine as E2 and which is controlled by a control unit as CU for regulating the speed of the engine as E2 to maintain the same in substantial synchronism with the master engine E1. Such regulation of the engine speed by the motor M can be accomplished in a number of ways, for example by affecting the rate at which fuel is supplied to the engine E2, but at present I prefer the well-known arrangement in which variable pitch propellers are employed on an airplane or other aircraft and wherein the speed of each engine may be affected in a desired amount by adjusting the pitch of the propeller driven thereby.

Figure 2:
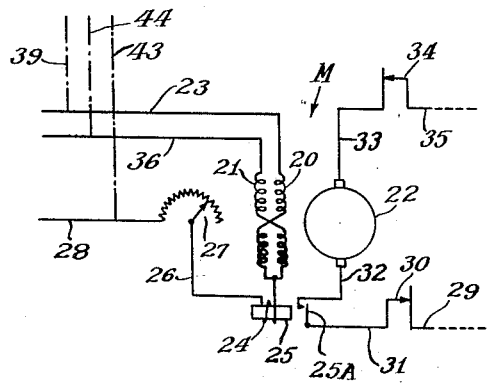
Fig. 2 is a diagrammatic view of a motor which is responsive to my novel control apparatus for regulating engine speed.

Referring to the wiring diagram of the motor M in Fig. 2, said motor is preferably of the direct-current type operable on low voltage and is provided with two alternatively energizable field coils 20 and 21 for driving the armature 22 of the motor M in either a forward or a reverse direction. When circuit is completed from a source of voltage through a conductor 23 to the field coil 20, in a manner to be explained, and thence through the winding 24 of a relay 25, conductor 26, rheostat 27, and conductor 28 back to the source of voltage, field coil 20 is energized for driving the motor M, say, forwardly, and at the same time the relay 25 closes its normally open contact 25A to complete circuit from the same or another voltage source through conductor 29, a normally closed cam contact 30, conductor 31, relay contact 25A, conductor 32, winding of armature 22, conductor 33, a normally closed cam contact 34, and conductor 35 back to the voltage source. Normally the motor M is then driven forwardly until such time as circuit to the field coil 20 is broken, whereupon relay 25 is deenergized and opens its contact 25A to break the circuit to the armature 22 and thereby stop the operation of the motor M, this arrangement insuring that the motor will have no tendency to race when the field is demagnetized. As the motor turns, it actuates a means which, in the present instance, causes a variation in the pitch of the propeller P2, Fig. 1, and such means may comprise, for example, a worm rack operable through suitable devices to change the pitch of the propeller and effect a corresponding adjustment of the engine speed, or the motor M can expeditiously serve to actuate a fluid pressure system such as is shown, for example, in United States Letters Patent No. 2,188,313, issued January 30, 1940, for varying the pitch of the propeller P2. Preferably the mechanical reduction ratio afforded by the pitch adjusting means is great enough so that, in connection with certain other features of the control apparatus described hereinafter, it serves to insure that there will be no tendency for the device to hunt before attaining a condition of substantial synchronism.

In a manner fully described hereinafter, the field coil 20 of the motor M can normally be energized to cause the pitch of the propeller P2 to be varied in a predetermined direction only when the rotation of the propeller P2 relative to the propeller P1 is in a certain sense, say counter-clockwise, assuming the propellers P1 and P2 to be rotating in a clockwise direction, as viewed from the rear looking toward the nose of the aircraft shown in Fig. 1, such energization of the field coil 20 being effected under the control of the control unit CU, Fig. 1. However, when the rotation of the propeller P2 relative to the propeller P1 is in a clockwise sense, still assuming both of the propellers P1 and P2 to be rotating clockwise as viewed from the rear of the aircraft, the control unit CU may establish a circuit from the aforesaid source of voltage to a conductor 36, the field coil 21, winding 24 of relay 25, conductor 26, rheostat 27, and conductor 28 back to the voltage source, and this is effective to drive the motor M in its reverse direction in a manner similar to that described hereinabove for forward rotation of the motor M. Thus the motor M can actuate the pitch-adjusting means of the propeller P2 either in a forward or in a reverse direction for bringing the engine E2 into substantial synchronism with the engine E1.

If, for example, it is required that the engine E2 be slowed down relative to the engine E1, the pitch of the propeller P2 should be increased to thereby increase the load on the engine E2, and this is accomplished in the present instance by energizing the field coil 21 to drive the motor M in its reverse direction. On the other hand, if the speed of engine E2 is to be increased, the load on this engine is decreased by energizing the field coil 20 of the motor M to thereby drive the motor forwardly and thus decrease the pitch of the propeller P2 and consequently the load on the engine E2.

The cam contacts 30 and 34 serve as limit switches for breaking circuit to the armature 22 in the event the propeller P2 is adjusted to one or the other of its extreme angular positions. It will be understood that while I have described the motor M as being a direct-current motor equipped with separate field coils for forward and reverse rotation, it would be equally feasible to employ a single field coil with a reversing switch arrangement that would be responsive to the alternative potentialization of the conductors 23 or 36. It is likewise manifest that an alternating-current motor could be employed in lieu of a direct current motor, the reversible shading-coil type of motor being satisfactory for this purpose.

Figure 3:
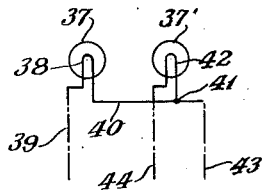
Fig. 3 is a diagrammatic view of an indicating device which may be associated with the control apparatus.

It may be desirable to furnish some indication to the pilot of the aircraft when the rotative speeds of the propellers as P1 and P2 differ in a substantial amount and to also indicate in what sense the propeller as P2 is rotating relative to the master propeller as P1. To this end, lamps 37 and 37', Fig. 3, may be provided on the instrument panel for each propeller as P2. Preferably these lamps are operated under the control unit CU, Fig. 1, and this may be accomplished by connecting one terminal of the filament 38 of the lamp 37 to the conductor 23, Fig. 2, by a conductor 39, the other terminal of the filament 38 being connected by a conductor 40 to one terminal 41 of the filament 42 of lamp 37', and thence through a conductor 43, Figs. 3 and 2, to the conductor 28. The other terminal of the filament 42 is connected by a conductor 44 to the conductor 36, and thus whenever circuit is closed by the control unit CU to the field coil 20, the lamp 37 will be lighted, but if circuit is closed to the field coil 21, the lamp 37' will be lighted. While I have illustrated a visual signal means for the purpose of indicating relative rotations of the propellers, it is equally expedient to employ an audible signal, or both.

Figure 4:
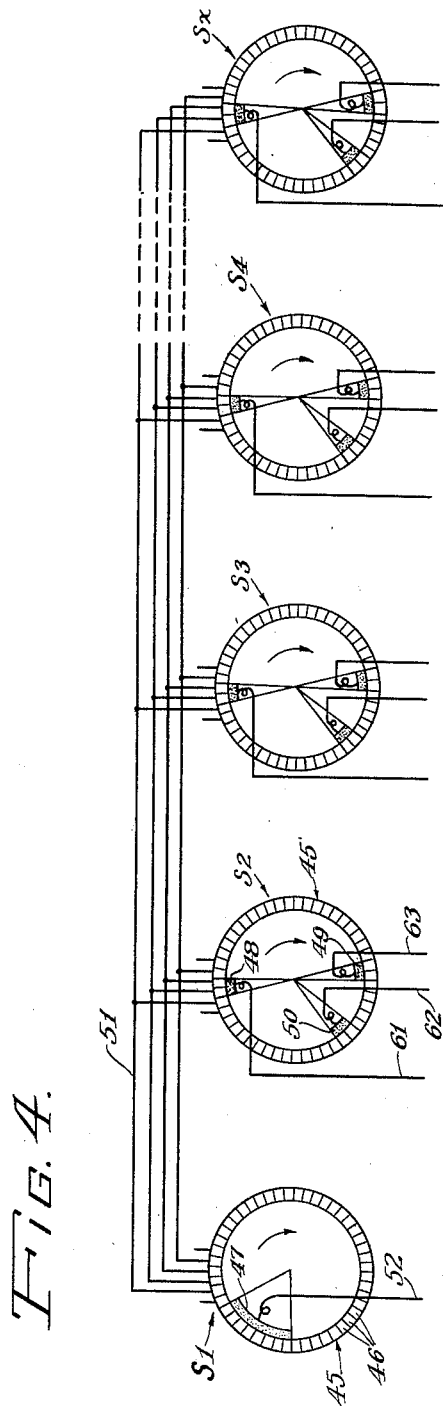
Fig. 4 is a diagrammatic view of a series of commutator switches and circuit interconnections therefor employed in one embodiment of my invention.
Figure 5:
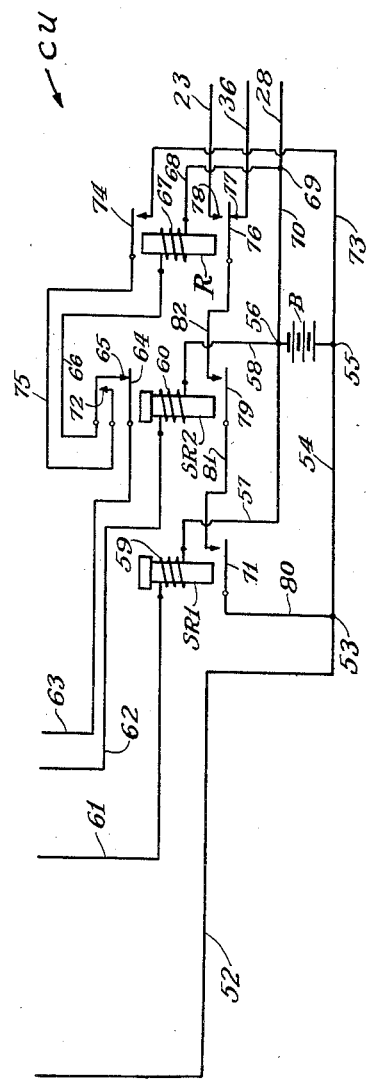
Fig. 5 is a diagrammatic view of a control relay arrangement which may be utilized in conjunction with the commutator switches shown in Fig. 4.

Referring now to the embodiment of the invention shown in Figs. 4 and 5, each of the switches as S1 and S2, Fig. 1, comprises a commutator generally designated 45 stationarily mounted on the frame of the associated engine as E1, this commutator being composed of a number of segments 46 which are insulated from each other and are arranged around the circumference of a circle. The switch S1 of the master engine E1 is provided with a single brush 47 that is rotatably mounted so as to make wiping contact with the segments 46 of the commutator 45 of the switch S1. Brush 47 is adapted to be driven by the propeller shaft of the master engine E1 either by being mounted directly thereon or by being geared thereto. The switch S2 includes a commutator 45' stationarily mounted on the engine E2 and rotatable cooperating brushes 48, 49 and 50 which are maintained in fixed circumferentially spaced relation to each other and are driven by the crank shaft of the engine E2. The commutators 45 and 45' of the switches S1 and S2 respectively are interconnected segment for segment by conductors included in a cable generally designated 51, Figs. 1 and 4, which extends between the switches S1 and S2.

If the aircraft includes further engines in addition to those shown in Fig. 1, each such engine will have associated therewith a commutator switch as S3, S4, and so on to Sx, and all of the commutators of these switches will be interconnected segment for segment with the commutator 45 of the switch S1 in the same manner as is the commutator 45' of the switch S2, which is to say by conductors in the cable 51.

Thus a flexible electrical connection is provided between the master switch S1 and the switches as S2 of the engines as E2 that are to be substantially synchronized with the master engine E1.

The brush 47 of the switch S1 is maintained in electrical contact (for instance, by means of a slip ring or the like) with a conductor 52, Figs. 4 and 5, which leads to a terminal 53 that is connected by a conductor 54 to one terminal 55 of a source of voltage B. The other terminal 56 of the voltage source B is respectively connected by conductors 57 and 58 to one side of each of the windings 59 and 60 of a pair of slow-to-release relays SR1 and SR2. The other side of the winding 59 of the relay SR1 is connected by a conductor 61 to the brush 48 of the switch S2, Fig. 4. Similarly, the other side of the winding 60 of the relay SR2 is connected by a conductor 62 to the brush 50 of the switch S2. Brush 49 is electrically connected through a conductor 63 to the terminal of a contact 64 of the relay SR2, which contact is normally in engagement with another contact 65 when relay SR2 is deenergized. Contact 65 is connected by a conductor 66 to one side of the winding 67 of a quick-acting relay R, and the other side of this winding is connected through a conductor 68 to the terminal 69 and thence by a conductor 70 to the terminal 56 of the voltage source B.

If the propellers P1 and P2, Fig. 1, are rotating in exact timed relation, there is no relative rotation of the brushes of the switches S1 and S2. However, when the propeller P2 rotates relative to the propeller P1, there is relative rotation of the brushes 48, 49 and 50 of the switch S2 with respect to the brush 47 of the switch S1 and in this event the brush 47 is successively brought into electrical contact with the brushes 48, 49 and 50, the sequence in which such contacts are made being determined by the sense of the relative rotation of the propellers P1 and P2, as will now be explained. Assuming that normally the direction of rotation of the propellers is such that the brushes of the switches as S1 and S2 rotate clockwise as viewed in Fig. 4, if the propeller P2 rotates more slowly than does the master propeller P1, the brushes of the switch S2 will rotate counterclockwise relative to the brush 47 of the switch S1. Under these circumstances, the brush 47 may first be brought into electrical contact with the brush 48 whereupon circuit is momentarily completed from the terminal 55 of the voltage source B through conductor 54, terminal 53, conductor 52, brush 47, conductors of cable 51, brush 48, conductor 61, winding 59 of the slow-to-release relay SR1, and conductor 57 to the terminal 56 of the source B of electric current. Relay SR1 thereupon energizes and closes its contact 71. Continued counterclockwise relative rotation of the brushes of switch S2 causes the brush 47 to be next brought into electrical contact with brush 49 and circuit is thereupon extended from the terminal 55 of the source B of electric current in a manner similar to that just described through the brush 49 and conductor 63 to the normally closed contacts 64 and 65 of the relay SR2 to the conductor 66 and thence through the winding 67 of relay R, conductor 68, terminal 69 and conductor 70 to the terminal 56 of the source B of electric current. Relay R thereupon energizes and remains energized so long as brush 47 remains in electrical contact with the brush 49. Relay SR1, being slow to release, maintains its contact 71 closed for a predetermined length of time after the brush 47 moves out of electrical contact with the brush 48; hence if the rate of relative rotation of the propeller P2 is great enough, the brush 47 of switch S1 may be brought into electrical contact with the brush 50 of switch S2 prior to the time when relay SR1 releases its contact 71. Brushes 49 and 50 are spaced comparatively close together about the periphery of the commutator 45' and the brush 47 is of such width that it is brought into electrical contact with the brush 50 prior to moving out of electrical contact with the brush 49. Therefore, relay R remains energized while circuit is completed from brush 47 through the brush 50 and conductor 62 to the winding 60 of relay SR2 and thence through conductor 58 to the terminal 56 of the source of electric current. Relay SR2 in energizing closes circuit between its contact 65 and another contact 72 prior to separating the contact 64 from the contact 65, the contacts 72, 65 and 64 thus constituting make-before-break contacts. Such closure of the contact 65 with the contact 72 completes a circuit from terminal 55 of the voltage source B through a conductor 73 and a contact 74 of the relay R, which contact is closed while relay R is energized, and conductor 75 through the contacts 72 and 65 to the conductor 66 to thereby provide a holding circuit for the relay R so long as relay SR2 remains energized. When relay R was energized upon establishment of a circuit through brushes 47 and 49, it separated a movable contact 76 thereof from a stationary fixed contact 77, with which it is in engagement when relay R is deenergized, and brought this contact 76 into engagement with another stationary contact 78 which is connected to the conductor 23, Figs. 5 and 2. Energization of the relay SR2 in the manner described closes contact 79 of this relay and assuming that the degree of relative rotation of the propeller P2, Fig. 1, is sufficiently great that the relay SR2 is energized prior to the time relay SR1 has released its contact 71, circuit is completed from the terminal 55 of the voltage source B, through conductor 54, terminal 53, conductor 80, relay contact 71, conductor 81, contact 79 of relay SR2, conductor 82 and contacts 76 and 78 of the relay R to the conductor 23 and thence circuit is extended in the manner hereinabove described through the field coil 20 of the motor M to the conductor 28 which leads to the terminal 69, Fig. 5, that is connected by the conductor 70 to the terminal 56 of the voltage source B.

It will be seen from the foregoing that whenever the propeller P2 is rotating relative to the propeller P1 in such a manner that the brushes of the switch S2 rotate counterclockwise relative to the brush 47 of the master switch S1, as viewed in Fig. 4, the relays SR1 and SR2 are alternately energized and if the degree of relative rotation is such that relay SR2 is energized within the release time of the relay SR1, an energizing circuit is completed through the contacts 71 and 79 of the relays SR1 and SR2 and the contacts 76 and 78 of the relay R to the field coil 20 of the motor M for thereby driving the motor M in a forward direction, which in the present instance suffices to increase the speed of the engine E2 (either by reducing the pitch of the propeller P2 to lighten the load on the engine E2, or by regulating the speed of the engine E2 in any other equivalent manner) for thereby decreasing the counterclockwise relative rotation of the propeller P2 with respect to the propeller P1, as viewed from the rear of the aircraft. Thus, the control unit CU, Fig. 5, is responsive to at least a predetermined variation in the rotative speed of the propeller P2 relative to the propeller P1, as detected by means of the commutator switches as S1 and S2, Fig. 4, for correcting the relative rotative speed of the propeller P2.

The brushes 48, 49 and 50, Fig. 4, continue to rotate counterclockwise relative to the brush 47 so long as there is any such relative rotation of the propeller P2, and as brush 47 moves out of electrical contact with brush 50, the energizing circuit to the winding of the relay SR2 is broken to thereby initiate deenergization of this relay. If brush 47 then electrically contacts brush 48 prior to the time relay SR2 has released its contact 79, the relay SR1 is energized to effect or maintain closure, as the case may be, of the contact 71 thereof, and the above described energizing circuit to the winding 20 of the motor M continues.

For a reason which will appear hereinafter, the release times of the relays SR1 and SR2 and the brush and segment widths are so proportioned that it will not be possible, upon initiation of such relative rotations as may be expected to develop in practice, for a brush as 50 to move out of electrical contact with the master brush 47 and back into electrical contact with the master brush 47 (at least during the first relative turn of the brushes as 50 with respect to the brush 47) within the period during which the relay as SR2 remains in an operative condition after it has been initially energized by the first electrical contact between brushes as 47 and 50. Thus, the average relative velocity of the brushes as 50 with respect to the master brush 47 must have at least a predetermined value in order that the relays SR1 and SR2 may be maintained in a continual state of concurrent operation, and depending upon whether or not the relative acceleration persists long enough to produce this average relative velocity, an energizing circuit to the motor M will be either continuously or intermittently established by the relays SR1 and SR2. In no event, however, will a relay as SR2 be maintained in an operative condition throughout the entire initial relative turn of a brush as 50 with respect to the master brush 47 in a given direction.

After the first rotation of the brushes as 50 relative to the master brush 47 has been completed, if relative acceleration of the propellers P1 and P2 continues, this may cause the relative rotation to become great enough for the relays SR1, SR2 and R (still assuming counterclockwise relative rotation of the brushes 48, 49 and 50) to remain in a continual state of energization, relay R being held locked up through its aforesaid holding circuit controlled by relay SR2, and the field coil as 20 and the armature 22 of the motor M are therefore maintained energized for continuously operating the motor M until the speed of the engine E2 has been varied sufficiently to bring the average relative velocity of the propellers P1 and P2 below the aforesaid value as determined by the time factor embodied in the slow-to-release relays SR1 and SR2. Thereafter, the control unit CU continues to actuate the motor M for varying the velocity of the propeller P2 relative to the master propeller P1, but in this instance circuit to a motor field coil as 20 and armature 22 cannot be maintained throughout the entire time interval between two successive electrical contacts of a brush as 47 with a brush as 50, inasmuch as one or the other of the relays SR1 or SR2 will be released in this interval of time. Hence, as the brushes rotate relative to each other, an energizing circuit is repeatedly established by the relays SR1 and SR2 to a motor field coil as 20. The frequency with which the motor M is thus repeatedly actuated obviously decreases while a condition of substantial synchronization is being approached, since the brush 47 does not repeatedly contact the brushes 48 and 50 at as great a rate at low relative speeds. Thus, the motor M is comparatively infrequently actuated at low relative speeds approaching zero, and this, in combination with the high reduction ratio and negligible momentum of the motor drive, renders the likelihood of the apparatus hunting while the propellers are being brought into timed relation extremely remote.

It will be appreciated that there might be an instance in which the relays SR1, SR2 and R are energized for correcting relative rotation of the propeller P2 such as causes counterclockwise relative rotation of the brushes as 50, Fig. 4, as just described, and wherein substantial synchronization is restored within the time interval while the relays SR1 and SR2 are still concurrently operative. However, this would only be likely to occur where the relative velocity was very small to begin with, and under such circumstances the overlap in release times of the relays SR1 and SR2 is relatively slight, so that in addition to the fact that the motor M is infrequently energized when the propeller P2 is approaching substantial synchronism with the propeller P1, the duration of each such energization period of the motor M becomes correspondingly small. In any event the propeller P2 would not be brought far enough past a condition of substantial synchronism to cause hunting of the control apparatus.

In the event the propeller P2 rotates more rapidly than the propeller P1, still assuming that both propellers are rotating in such a direction as to drive the brushes of the switches S1 and S2 clockwise as viewed in Fig. 4, the brushes 48, 49 and 50 of the switch S2 associated with the propeller P2 then rotate clockwise relative to the brush 47 of the master switch S1. In this case the brush 47 may be brought into electrical contact first with, say, the brush 48, thereby energizing the slow-to-release relay SR1. If the clockwise relative rotation of the propeller P2 continues, the brush 47 then breaks contact with the brush 48 and is brought into electrical contact with the brush 50 to thereby energize the slow-to-release relay SR2. Continued relative rotation of the brushes causes the brush 49 to be brought into electrical contact with the brush 47 while the latter is still in electrical contact with the brush 50. When relay SR2 energizes, it separates its contacts 64 and 65 so that when circuit is extended from the voltage source B through brush 47 and the brush 49 to thereby apply potential on the conductor 63, there is no further effect insofar as the relay R is concerned because the connection from the conductor 63 to the conductor 66 which leads to the winding of the relay R is broken when the aforesaid contacts 64 and 65 are separated. Hence under these circumstances the relay R does not energize and the contacts 76 and 77 of this relay remain in engagement while the contact 78 of this relay remains separated from the contact 76. Assuming that the degree of relative rotation is such that the slow-to-release relay SR2 is energized within the release time of the relay SR1, a circuit is completed as aforesaid from the terminal 55 of the voltage source B through conductor 54, terminal 53, conductor 80, contact 71 of relay SR1, conductor 81, contact 79 of relay SR2, conductor 82 and contacts 76 and 77 of the relay R to the conductor 36, Figs. 5 and 2, and thence through the field coil 21 of the motor M, winding 24 of relay 25, conductor 26, rheostat 27, conductor 28, terminal 69, and conductor 70 to the terminal 56 of the source of voltage B. This results in the energization of the field coil 21 and of the relay 25 to thereby initiate reverse rotation of the motor M and this is effective to adjust the speed of the engine E2, for example, by varying the pitch of propeller P2, in such a manner as to tend to correct the rotative speed of the propeller P2 relative to the propeller P1.

As explained hereinabove in connection with the operation for correcting low relative velocity of the propeller P2, the just described operation for correcting high relative velocity of this propeller entails continuous operation of the motor M at a comparatively high relative velocity of the propellers, but an intermittent actuation of the motor M while a state of substantial synchronism is being approached, such latter operation of the motor M being repeated often enough to bring the propeller P2 and the engine E2 into substantial synchronism with the master propeller P1 and the master engine E1, it being recalled that the release times of relays SR1 and SR2, Fig. 5, are such that the energizing circuit to a motor field coil as 21 cannot be maintained throughout the first complete turn of the brush 47 of the switch S1 relative to the brushes of the switch S2. The only substantial difference between the just described operation of the control unit CU for correcting high relative velocity of the propeller P2, as compared with the operation for correcting low relative velocity of this propeller, is that the relay R remains reenergized at all times in the former operation inasmuch as the master brush 47 will always electrically contact the brush 50 to energize the relay SR2 at a time when the relay R is in a deenergized state and, unless substantial synchronization is effected after the brush 47 breaks contact with the brush 50 and while it remains in electrical contact with the brush 49, the relay SR2 will remain energized to keep its contacts 64 and 65 open at least until the brush 49 moves out of electrical contact with the brush 47 so that an energizing circuit cannot be completed to the winding 67 of relay R.

It will be appreciated from the foregoing description that when the brushes of the secondary switch S2 are rotating clockwise relative to the brush 47 of the master switch S1, as viewed in Fig. 4, the relay R normally should remain deenergized to thereby condition a circuit to the reverse field coil 21 of the motor M. On the other hand, if the brushes of the switch S2 are rotating counterclockwise relative to the brush 47 of the switch S1, the relay R should be energized to enable the forward field coil 20 of the motor M to be energized. It is to be noted in this connection that a condition of substantial synchronization might exist while the brush 47 is in electrical contact with the brush 50 but is out of electrical contact with the brush 49 so that the relay SR2 alone is energized. Then, if the propeller P2 were to commence relative rotation in such a direction that the brushes 48, 49 and 50 of the switch S2 start to rotate counterclockwise relative to the brush 47 of the switch S1, as viewed in Fig. 4, the brush 50 would move out of electrical contact with the master brush 47 and the brush 48 would be brought into electrical contact with the brush 47 to thereby energize relay SR1, and if this occurred within the release time of the relay SR2, a delay in the operative response of the control unit CU would be effected inasmuch as the relay R is not energized at the time the relays SR1 and SR2 are maintaining their contacts 71 and 79 closed concurrently, so that an energizing circuit would be momentarily established from the voltage source B through the aforesaid contacts 71 and 79 to the contacts 76 and 77 of the relay R and thence through the conductor 36 to the reverse field coil 21 of the motor M. It has also been noted hereinabove, however, that the release time of the relay SR2 is such that even under the most extreme conditions that might be foreseen in practice, the relay SR2 will not remain energized throughout the interval between two successive electrical contacts of a brush 50 or 48 with the brush 47 during the first relative turn of these brushes. Moreover, the apparatus should so operate that under such extreme conditions the relay SR2 would open its contact 79 and close its contacts 64 and 65 prior to the time the brush 49 moves into electrical contact with the brush 47.

Thus, the release times of the relays and the brush widths may be so selected that under any circumstances the relay SR2 is fully deenergized at the time brush 47 electrically contacts the brush 49 during the first counterclockwise rotation of the brush 50 of switch S2 relative to the brush 47 of the switch S1, Fig. 4. Hence, despite any operative delay which might be experienced under the conditions just described, relay R will thereafter become energized and if the condition of counterclockwise relative rotation of the brushes of switch S2 persists, the relay R will be energized each time the relay SR2 assumes a state of energization, as described hereinabove, and circuit is thus conditioned to the forward field coil 20 of the motor M.

It will be understood that the control unit CU, Figs. 5 and 1, is associated with the switches S1 and S2 for controlling the speed of the engine E2 relative to the master engine E1. If there are additional engines to be synchronized with the master engine E1 on the aircraft, each such engine is provided with a switch such as S3 or S4 and a control unit identical with the unit CU is associated with such switch and the master switch S1 for controlling the operation of a motor similar to the motor M associated with the particular engine to be synchronized.

In the circuit shown in Fig. 4, there is a possibility, particularly where there are a large number of engines to be synchronized, that a bridging condition may occur when the brushes on the various commutators assume certain relative positions. To avoid this feature, an arrangement shown in Figs. 6 and 7 may be resorted to and by referring to these figures, it will be seen that the master engine E1, Fig. 1, has associated therewith a series of master switches S1a, S1a', S1a'', and so on. Each of these master switches is identical in construction with the switch S1 shown in Fig. 4 and the brushes 47a of the various master switches are connected in parallel by a conductor 52a to a terminal 53a and thence by a conductor 54a to the terminal 55a of the voltage source Ba, Fig. 8, the parts bearing the same reference characters and differing only in the suffix attached thereto being identical with corresponding parts in Fig. 5. Conductors contained in cables as 51a, 51a' and 51a" interconnect the commutators as 45a of the master switches as S1a, S1a', and S1a" respectively with the commutators as 45'a of the switches S2a, S3a and S4a associated with the engines as E2, Fig. 1, that are to be maintained in timed relation with the master engine E1, the commutator of each switch as S2a being thus interconnected segment for segment with its corresponding master switch commutator as 45a. Each switch as S2a is similar in construction to the corresponding switch as S2 shown in Fig. 4 except that in this instance the brushes as 50a are somewhat wider than are the brushes 50.

With the foregoing arrangement there is no likelihood that undesirable bridging conditions will occur, but in all other respects the apparatus schematically shown in Figs. 6, 7 and 8 operates in the same manner as that shown in Figs. 4 and 5, those elements which perform the same functions in the two circuits being numbered alike except for the suffixes on the reference characters.

In the circuit shown in Figs. 9, 10 and 11 the arrangement of the master switches S1b, Fig. 9, associated with the engine E1, Fig. 1, with relation to other commutator switches as S2b, Fig. 10, is generally similar to that shown in Figs. 6 and 7, which is to say that each switch as S2b is interconnected with its corresponding master switch as S1b by conductors in a cable as 51b. The switches as S2e, however, differ in construction from the switches S2 in that each switch is provided with three brushes 85, 86 and 87, which may all be contained within a semi-circle as shown in Fig. 10. Each switch as S2b has associated therewith a control unit as CUb which is somewhat similar in construction to the control unit CU shown in Fig. 5, like elements being numbered with the same reference character in Fig. 11, but bearing the suffix b. Thus the brush 86, Fig. 10, is connected by a conductor 61b to one side of the winding 59b of the relay SR1b, the other side of this winding being connected by a conductor 57b to a terminal 56b of the voltage source Bb. The conductor 62b, which is electrically connected to the brush 85 in this instance, is connected to one terminal of a normally closed contact 88 of a quick-to-release relay R2. If, during relative rotation of the brushes 85, 86 and 87 with respect to the brush 47b, the brush 47b electrically contacts the brush 85 at a time when the relay R2 is deenergized, circuit is extended from the terminal 55b of the voltage source Bb through the brushes 47b and 85 to the conductor 62b and the closed contact 88 and thence through a conductor 89 to a terminal 90 from whence a conductor 91 leads to one side of the winding 92 of another quick-to-release relay R1, the other side of this winding being connected by a conductor 93 to the terminal 56b of the source Bb, and under these conditions the relay R1 is energized to open its contact 94 and close its contact 95. Such closure of the contact 95 extends circuit from the terminal 90 which is potentialized, so long as brushes 47b and 85 are in electrical contact, through conductor 96, contact 95, conductor 97 to a terminal 98 and thence through a conductor 99 to a contact 100 of the slow-to-release relay SR1b.

Brush 47b is of such width that it can never be in electrical contact with more than one of the brushes 85, 86 or 87 at any instant. Hence, assuming that there is counterclockwise rotation of the brushes 85, 86 and 87 relative to the brush 47b, the just described energization of the relay R1 is only momentary, if relay SR1b has not been energized to maintain its contact 100 closed at the time the relay R1 is energized, for when brush 47b moves out of electrical contact with the brush 85, circuit from the source Bb to the conductor 62b is broken to remove this source of energization from the winding 92 of the relay R1 and the only other source of energization for this winding is through the contact 100 of the relay SR1b which, as has just been explained, is open until the brush 47b electrically contacts the brush 86 during relative counterclockwise rotation of the brushes 85, 86 and 87, as viewed in Figs. 9 and 10 so that relay R1 does not remain energized.

When brush 47b is brought into electrical contact with the brush 86, a circuit is extended from the voltage source Bb through brushes 47b and 86 to the conductor 61b which leads to the winding 59b of the slow-to-release relay SR1b, the other side of this winding being connected by a conductor 57b to the source Bb. Relay SR1b thereupon energizes and closes its normally open contacts 100 and 71b. As brush 47b moves out of electrical contact with the brush 86 during continued relative rotation of the brushes, the relay SR1b commences to deenergize but being slow to release it maintains its contacts 71b and 100 closed for a predetermined time after deenergization of this relay is initiated. Assuming that the degree of relative rotation of the propellers is such that brush 87 moves into electrical contact with the brush 47b during the aforesaid interval, circuit is extended from the source Bb through the brushes 47b and 87 to the conductor 63b which leads to the normally closed contact 94 of the relay R1, which relay, as has just been explained, remains deenergized when the brushes 85, 86 and 87 are rotating counterclocking relative to the brush 47b and during the time the brush 47b is not in electrical contact with the brush 85. Hence, circuit is further extended from the contact 94 through a conductor 101 to a terminal 102 and thence through a conductor 103 to one end of the winding 104 of the relay R2, the other end of this winding being connected by a conductor 105 to a terminal 69b which is connected by conductor 70b to the voltage source Bb. Relay R2 thereupon energizes to open its contact 88 and close its contacts 106 and 107. Closure of the contact 106 establishes a circuit from the terminal 102 through a conductor 108, contact 106 and conductor 109 to the terminal 98. It having been assumed that the relay SR1b is maintaining its contact 100 closed at the time relay R2 is thus energized, circuit continues from terminal 98 through conductor 99 and contact 100 to a conductor 110 leading to a terminal 111 which is included in the conductor 80b so that circuit from the terminal 56b of the source Bb is now completed as described through the winding 104 of relay R2, contact 106 of this relay and contact 100 of relay SR1b back to the terminal 55b of the source Bb, and a holding circuit is thereby established for maintaining the relay R2 energized so long as relay SR1b does not release its contact 100. Inasmuch as the contact 71b of relay SR1b is closed while this relay remains in an operative condition, circuit is extended from the terminal 55b of the source Bb through conductor 54b, terminal 53b, conductor 80b, terminal 111, conductor 112, contact 71b, conductor 81b, terminal 113, conductor 114 and contact 107 of relay R2 to the conductor 23b which leads to a forward field coil as 20 of a motor as M, Fig. 2, circuit being thereafter completed through the conductor 28b back to the terminal 56b of the source Bb. Thus whenever the relay R2 is energized prior to the time the relay SR1b has been released, it is held locked up until relay SR1b is released and in so doing it completes an energizing circuit to the field coil as 20 of a motor as M, which motor thereupon functions to correct counterclockwise (as viewed from the rear of the aircraft) relative rotation of a propeller as P2, Fig. 1.

If brush 85 should electrically contact the brush 47b under these circumstances while the relay SR1b is still maintaining its contacts 100 and 71b closed, circuit may be extended from the source Bb through the brushes 47b and 85 and conductor 62b to one terminal of the contact 88 of the relay R2, but inasmuch as this relay is being held locked up as aforesaid, circuit cannot be completed to the winding 92 of the relay R1 and therefore relay R1 remains deenergized. As in the case of the circuit shown in Fig. 5, the slow-to-release relay SR1b is so timed that, under contemplated working conditions, it will not remain energized throughout the entire interval between the first two successive electrical contacts of the brush 86 with the brush 47b during initiation of relative rotation in a given direction, although it may thereafter remain constantly energized if the relative velocity increases, and hence if there is counterclockwise relative rotation of the brushes of the switch S2b, Fig. 10, the relays SR1b and R2 may be maintained continually energized at high relative velocities, but at low relative velocities they are repeatedly energized in a manner such as described to repeatedly energize the field coil as 20 of the motor as M, Fig. 2, and as in the case of the control unit CU, Fig. 5, such repeated energizations of a field coil as 20 become increasingly infrequent and smaller in magnitude as a state of substantial synchronization is approached inasmuch as the amount of overlap of the release time of the relay SR1b subsequent to the instant when relay R2 is energized, is gradually reduced when the relative speed of rotation of the brushes is being diminished.

If there is clockwise rotation of the brushes 85, 86 and 87 relative to the brush 47b, as viewed in Figs. 9 and 10, the brush 87 may first move into electrical contact with the brush 47b to thereby cause energization of the relay R2 but inasmuch as relay R2 is quick to release it immediately deenergizes when electrical contact between brushes 47b and 87 is broken and prior to the instance when brush 86 electrically contacts brush 47b to thereby energize relay SR1b. Continued relative rotation of the brushes in this manner brings the brush 85 into electrical contact with brush 47b and if this occurs within the release time of the relay SR1b relay R1 is energized and the holding circuit is established for this relay through its contact 85 and the contact 100 of the relay SR1b in the same manner as the holding circuit was established for the relay R2 during counterclockwise relative rotation of the brushes of the switch S2b, Fig. 10, with respect to the brush 47b, Fig. 9. Thus circuit is extended from source of voltage Bb through the contact 71b of relay SR1b, conductor 81b, terminal 113, conductor 115 and a contact 116, which is closed when the relay R1 is energized to conductor 36b which leads to a reverse field coil as 21 of a motor as M, Fig. 2, and the motor M is thereupon actuated to correct the rotative speed of the propeller P2 relative to the propeller P1.

In the arrangement shown in Figs. 12, 13 and 14, a plurality of master switches as S1c, Fig. 12, are employed, which are similar to the master switches S1a shown in Fig. 6, these master switches being connected by individual cables as 51c to their corresponding commutator switches as S2c which are associated with the engines to be synchronized. The switches as S2c shown in Fig. 13, however, differ from any hereinabove described in that only two brushes as 120 and 121 are included in each of these switches. The brushes as 120 and 121 are spaced apart at an angle considerably less than 180 degrees so that there is a much greater travel from one brush to the other brush in one direction of relative rotation than there is in the opposite direction. The control unit CUc, Fig. 14, is identical with the unit CU in Fig. 5 in all respects except that in place of the quick-acting relay R a slow-to-release relay SR3 having the same arrangement of contacts is employed and the conductor 63c is connected to conductor 61c which is under control of the brush 120. Assuming that the brushes 120 and 121 are rotating counterclockwise relative to the master brush 47c, as viewed in Figs. 12 and 13, the brush 120 may first be brought into electrical contact with the brush 47c and thereupon circuit is completed from terminal 55c of the source Bc through conductor 54c, terminal 53c, conductor 52c, brush 47c, conductors in the cable 51c, brush 120 and conductor 122 to a terminal 123 to which is connected a conductor 61c leading to one end of the winding 59c of the relay SR1c, the other end of this winding being connected by a conductor 57c to the terminal 56c of the source Bc and relay SR1c is thereupon energized to close its contact 71c. Circuit is also extended from the terminal 123 through conductor 63c to the contact 64c of the relay SR2c, which is normally engaged with its cooperating contact 65c and circuit then continues through conductor 66c to the winding 124 of the relay SR3 and thence through conductor 68c, terminal 69c and conductor 70c back to the terminal 56c of the source Bc so that relay SR3 is energized simultaneously with the relay SR1c. This causes the movable contact 76c of the relay SR3 to move out of engagement with the stationary contact 77c and into engagement with the other stationary contact 78c for conditioning circuit to a forward field coil such as 20 of a motor such as M, Fig. 2.

As the brush 121 continues to rotate counterclockwise relative to the brush 47c, Figs. 12 and 13, brush 121 eventually contacts brush 47c and circuit from the source Bc is extended through these brushes to the conductor 62c and thence through the winding 60c of the relay SR2c back to the source Bc. Relay SR2c thereupon energizes to separate the contacts 64c and 65c and engage the contact 65c with the contact 72c and if this occurs before the relay SR3 has been released, a holding circuit is established for the winding 124 of the relay SR3 through the contact 74c of this relay and the contacts 65c and 72c of the relay SR2c. Furthermore, if relay SR2c is energized within the release time of the relay SR1c, a circuit is completed from the source Bc through the closed contact 71c of the relay SR1c, closed contact 79c of the relay SR2c and contacts 76c and 78c of relay SR3 to the field coil as 20 of the motor M, Fig. 2, to thereby actuate said motor for correcting the speed of the engine with which it is associated.

Relays SR1c, SR2c and SR3c are so timed that they will be released, even under extreme operating conditions, in the interval which elapses while a brush as 47c is traversing the larger relative arc between the brushes 120 and 121 during the initial relative turn of the brushes in a given direction. Thus if the brush 121 had originally been in electrical contact with brush 47c at the instant the brushes 120 and 121 commenced rotating counterclockwise relative to the brush 47c, as viewed in Figs. 12 and 13, relay SR2c would have been initially energized but in the interim following the breaking of electrical contact between brushes 47c and 121 and the contacting of brush 120 with brush 47c, the relay SR2c is released so that whenever there is such counterclockwise relative rotation of the brushes 120 and 121, such prior energization of the relay SR2c is without effect and the sequence of operations of the control unit CUc does not become effective until the relays SR1c and SR3 have been first energized followed by the energization of the relay SR2c.

When there is clockwise rotation of the brushes 120 and 121 relative to the brush 47c, Figs. 12 and 13, however, the operative sequence does not commence until the relay SR2c has first been energized upon contact of the brush 121 with the brush 47c for the reason that under these conditions relays SR1c and SR3 will always be deenergized at the time relay SR2c is initially energized. If brush 120 then moves into contact with the brush 47c within the release time of the relay SR2c, relay SR3 will not be energized inasmuch as relay SR2c maintains its contacts 64c and 65c separated so that no energizing circuit can be established through the conductor 63c to the winding 124 of relay SR3, and unless relay SR2c releases while brushes 120 and 47c are still in electrical contact, relay SR3 will not become energized during such clockwise relative rotation of the brushes 120 and 121. Relay SR1c energizes and closes its contact 71c when there is contact between the brushes 47c and 120 and if this occurs before the relay SR2c has been released, circuit is extended from the source Bc through the contact 71c of relay SR1c, contact 79c of relay SR2c, contacts 76c and 77c of relay SR3 to the conductor 36c which leads to a reverse field coil 121 of a motor as M, and this motor is thereupon actuated to correct the speed of its associated engine as E2, Fig. 1.

It may happen that the brushes 120 and 121 will successively traverse the brush 47c at a sufficient rate in one direction of relative rotation to set the control unit CUc for correcting relative rotation in that direction and that operating conditions may undergo a subsequent change which produces an opposite relative rotation of the brushes, in which event the setting of the control unit CUc will effect an operative lag until such setting is subsequently changed upon the completion of not greater than approximately one full turn of relative rotation in the new direction. Even under extreme conditions, however, such operative lag will be of only slight duration so that it will not interfere with the successful operation of the apparatus as has been explained hereinabove in connection with the foregoing embodiments of the invention.

The arrangement in Figs. 15, 16 and 17 is identical with that shown in Figs. 9, 10 and 11 in all respects, except that slow-to-release relays SR2d and SR3d have been substituted for the quick-acting relays R1 and R2. Also, the conductor 23d is in this instance connected to a terminal of the contact 116d of the relay SR2d and the conductor 36d is connected to a terminal of the contact 107d of the relay SR3d. When the direction of rotation of the brushes 85d, 86d, and 87d is counterclockwise relative to the master brush 47d as viewed in Figs. 15 and 16, the brush 47d may originally be in electrical contact with brush 87d but while brush 47d is passing from the brush 87d to the brush 85d, the relay SR3d if it was originally energized is released by the time brushes 47d and 85d are brought into electrical contact, the release time of relay SR3d being so selected that this will occur during the first relative counterclockwise turn of the brushes in the switch S2d.

Electrical contact of the brushes 47d and 85d establishes a circuit from the source of voltage Bd through these brushes and conductor 62d to one terminal of the normally closed contact 88d of the relay SR3d and inasmuch as this relay is deenergized circuit continues through the contact 88d and conductor 89d, terminal 90d and conductor 91d to the winding 125 of the relay SR2d and thence through conductor 93d to the voltage source Bd. Relay SR2d thereupon energizes to open its contact 94d and closes contacts 95d and 116d. Continued relative rotation of the brushes as aforesaid brings the brushes 47d and 86d into electrical contact to thereby extend circuit from the source Bd to the conductor 61d for energizing the winding of the relay SR1d. If this occurs before relay SR2d has released, a holding circuit for relay SR2d is established through the contact 100d of relay SR1d and contact 95d of relay SR2d to the winding 125 of the latter relay, and hence the relay SR2d remains locked up so long as the relay SR1d does not release. As relative rotation continues, brush 87d comes into electrical contact with brush 47d and circuit is extended from the voltage source Bd through the brushes to the conductor 63d, which leads to one terminal of the contact 94d of the relay SR2d. However, if this occurs while the relay SR2d still remains locked up as aforesaid, circuit cannot be completed beyond the contact 94d inasmuch as this contact is held open when the relay SR2d is energized. Thus, in effect, relay SR3d is prevented from energizing so long as relay SR1d remains energized during counterclockwise relative rotation of the brushes of the switch S2d, Fig. 16.

Energization of the relays SR1d and SR2d completes an energizing circuit from the source of voltage Bd through the contact 71d and 116d of these relays to the conductor 23d for energizing a forward field coil as 20 of a motor as M, Fig. 2, and so long as counterclockwise rotation of brushes 85d, 86d and 87d relative to the brush 47d continues as viewed in Figs. 15 and 16, the slow-to-release relays SR1d and SR2d are alternately energized, to assume a concurrently operative condition either continuously or intermittently, depending upon the degree of relative velocity of the brushes, to either continuously or intermittently energize the motor field coil as 20 until a state of substantial synchronization is reached.

When there is clockwise rotation of the brushes 85d, 86d and 87d relative to the brush 47d, the relays SR1d, SR2d and SR3d will initially be in a deenergized state shortly prior to the establishment of electrical contact between the brushes 47d and 87d, but when such contact is established circuit is extended from the voltage source Bd through these brushes to the conductor 83d and thence through the normally closed contact 94d of relay SR2d, conductor 101d, terminal 102d, and conductor 103d, to the winding 120 of relay SR3d and thence through conductor 105d, terminal 69d and conductor 70d back to the source of voltage Bd so that relay SR3d is energized to maintain its contact 88d open and its contact 106d and 107d closed for a predetermined time after the brush 87d moves out of electrical contact with the brush 47d. If the degree of relative rotation is great enough so that brush 47d comes into electrical contact with the brush 86d during this interval, circuit is established through these brushes for energizing the relay SR1d and upon energization of this relay a holding circuit is established for the winding 120 of relay SR3d through the contact 106d of this relay and the contact 108d of relay SR1d so long as the latter relay remains in a state of energization. Opening of the contact 88d upon energization of the relay SR3d prevents the relay SR2d from energizing when brushes 47d and 85d come into electrical contact, provided relay SR1d is still energized to maintain the holding circuit for the relay SR3d. Concurrent operation of the relays SR1d and SR3d completes circuit from source of voltage Bd through the contacts 71d and 107d of these relays to the conductor 36d which leads to a reverse field coil as 21 of a motor as M, Fig. 2, and this circuit is either maintained continuously or is repeatedly established for every relative turn of the brushes in switch S2d with respect to the master brush 47d in the switch S1d, depending upon the value of the relative velocity, until the motor M has brought the engine which it controls back into substantial synchronism with the master engine.

It is desirable when the brushes of the switch S2d are rotating counterclockwise relative to the master brush 47d, that the relay SR3d be prevented from energizing. Of course, there is always the possibility that there may be a slight clockwise relative rotation of the brushes 87d and 86d which is sufficient to cause energization and locking up of the relay SR3d and that the relative rotation of the brushes may then be suddenly reversed so that the brushes 86d and 87d commence to turn counterclockwise relative to the master brush 47d and under these circumstances the relay SR3d may remain energized for a brief period during such counterclockwise rotation relative to the master brush 47d. The release time of relay SR1d is sufficiently limited so that this relay releases and breaks the holding circuit to the winding of the relay SR3d on the first counterclockwise relative turn of the brushes of the switch S2d, even under extreme conditions, at least by the time brush 47d has moved into contact with the brush 85d so that the operative delay effected as a result of the energized condition of the relay SR3d is promptly rectified when relay SR3d releases and closes its contact 88d, to thereby enable circuit to be extended from the source of voltage Bd through the brushes 47d and 85d to the winding of relay SR2d and thereafter the operation of the control unit CUd is the same as described hereinabove for relative counterclockwise rotation of the brushes 85d, 86d and 87d.

In all the foregoing embodiments of my invention, the control unit such as CU, Fig. 5, has included therein at least one relay such as SR2 which is common to the means for determining the direction of relative rotation of the brushes and the means responsive to the magnitude of such relative rotation. Thus in Fig. 5 not only does the relay SR2 cooperate with the relay R to condition circuit to one or the other of the field coils 20 or 21 of a motor as M, Fig. 2, depending upon the sense of the relative rotations between the brushes of the master switch as S1, Fig. 4, and the switch as S2, but relay SR2 also cooperates with the relay SR1 to complete the thus conditioned circuit whenever there is a predetermined rate of such relative rotation. This renders the sensitivity of the relative direction determining means comparable to that of the means responsive to the magnitude of relative speeds of rotation of the engines as E1 and E2, Fig. 1. It may be desirable in some instances that the relative direction determining means be considerably more sensitive than is the means responsive to magnitude of relative rotation and for this purpose a circuit such as is exemplified in Fig. 18 might be utilized. This arrangement is generally equivalent to that shown in Figs. 4 and 5 except that each master engine as E1, Fig. 1, has associated therewith at least two master switches as S1y and S1z, and two commutator switches as S2y and S2z are provided for each engine as E2. The segments of the switches as S1y and S2y are interconnected by a cable 51y, and those of the switches S1z and S2z by a cable 51z. The brushes 48y and 50y of the switch S2y cooperate with the master brush 47y of the switch S1y for operating the slow-to-release relays SR1y and SR2y which are similar to and function for the same purpose as the relays SR1 and SR2, Fig. 5, in so far as these relays are responsive to the magnitude of rotation of the brushes 48y and 50y relative to the brush 47y. The brushes 49z and 50z of the switch S2z cooperate with a master brush 47z to operate the relays SR2z and Rz which are similar to and function the same as the relays SR2 and R, Fig. 5, in so far as these relays are responsive to the sense of rotation of brushes 49z and 50z relative to the brush 47z.

The brushes of the switches S1z and S2z, however, may be geared to rotate at a much higher speed than the brushes of the switches S1y and S2y and thus any discrepancy in engine speeds is, in effect, magnified in so far as the switches S1z and S2z are concerned. The release time of the relay SR2z can be so adjusted as to accommodate this increased sensitivity and afford a more rapid response to the relay Rz to discrepancies in engine speeds. Hence the relay Rz will condition an energizing circuit to a selected one of the field coils 20 or 21 of the motor M, Fig. 2, sufficiently far in advance of a time when the relays SR1y and SR2y are operated under control of the switch S2y when there is a difference in relative rotative speeds of the rotative parts such as propellers P1 and P2, Fig. 1, that all likelihood of operative delay is eliminated.

Figure 19:
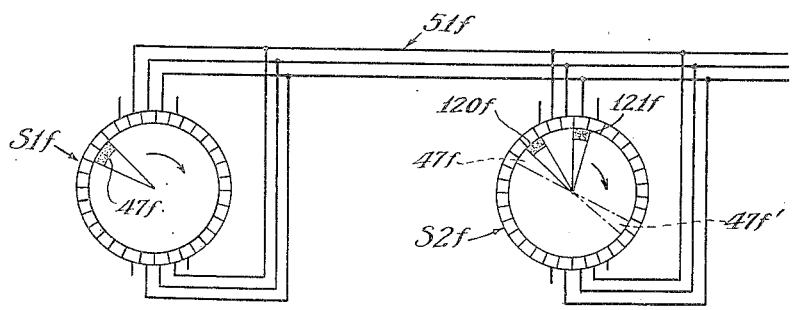
Fig. 19 is a diagrammatic view of an arrangement that might be used under certain conditions for reducing the number of conductors required in the cables that are used in conjunction with my apparatus.

It may be desirable, particularly where there are a large number of engines or the like to be correlated, to reduce the number of conductors required in the cables such as 51, Fig. 1, that interconnect the master switch as S1 with each of the subordinate switches as S2. To this end, it will be feasible in some instances to arrange the conductors as shown in Fig. 19 so that each segment of each switch as S1f or S2f is in electrical contact with the segment 180 degrees removed from it. This reduces the number of conductors required in a cable as 51f to one-half the number required in circuits as shown in Fig. 4. However, this also means that the master brush as 47f of the switch S1f is brought into electrical contact not only with those segments of a switch as S2f with which it would be in electrical contact in an arrangement as shown in Fig. 4, but also with those segments of the switch as S2f which are 180 degrees removed from the first-named segments of this switch. This will necessitate a somewhat different spacing of the brushes of a switch as S2f than would otherwise be required, and each relay as SR1c, Fig. 14, under control of one of these brushes will be energized a plurality of times (in the present instance, twice) in the course of a single turn of the master brush 47f relative to the brushes in the switch S2f. Taking for example the arrangement of the apparatus shown in Figs. 13 and 14, the brushes 120 and 121 would with the new arrangement be placed closer together, as are the brushes 120f and 121f, and the master brush 47f can be likewise made narrower than the brush 47c, Fig. 12, so that the relative arc transversed by the master brush 47f from the instant it moves out of electrical contact with either of the brushes 120f or 121f to the time when it moves into electrical contact with the other of these brushes (considering only the smaller arc) is appreciably less than 90 degrees. The relays as SR1c, SR2c and SR3, Fig. 14, which are under control of brushes as 120f and 121f, Fig. 19, have their release times adjusted to accommodate this small relative travel of the master brush 47f but will not respond to effect any premature energization of a relay as SR2c if, for example, the brush 47f being originally in electrical contact with the brush 120f then commences to rotate counterclockwise relative thereto, as viewed in Fig. 19, to thereby produce the same effect as though a diametrically opposite brush 47f' were to be brought into electrical contact with the brush 121f, the relative length of travel of a brush as 47f' from the position in which it is shown in Fig. 19, to the brush 121f being sufficiently great under these circumstances so that the relays as SR1c and SR3 may de-energize on the first relative turn of the brushes before the brush 47f' makes contact with the brush 121f.

As has been explained hereinabove in connection with the various embodiments of my invention, the release times of slow-to-release relays such as SR2, Fig. 5, or SR1b, Fig. 11, are so selected that each such relay is unable to remain in an operative condition during at least the first two successive electrical contacts established between the master brush and the brush to which such slow-to-release relay is electrically connected, upon initiation of contemplated relative rotations of the brushes. The time factor thus incorporated in the operation of these relays insures against misoperation of the control apparatus when there is a sudden reversal in the sense of relative rotation of the propellers under conditions which will be encountered in the normal use of aircraft. For example, in the embodiment illustrated in Figs. 9 to 11, the brushes 86 and 87 might be successively brought into electrical contact with the master brush 47 while rotating counterclockwise relative thereto, to thereby energize the relays SR1b and R2 for correcting a low rotative speed of the propeller as P2, Fig. 1, relative to the master propeller as P1, and there might then occur some change in operating conditions which causes the propeller P2 to rotate more rapidly than the propeller P1, so that the sense of relative rotation of the brushes is reversed. Hence, assuming relays SR1b and R2 to have been energized as aforesaid, the brushes 85, 86 and 87 thereupon commence to rotate clockwise relative to the master brush 47b, as viewed in Figs. 9 and 10, and upon the establishment of electrical contact between brushes 47b and 86, relay SR1b is re-energized. If this occurs prior to the release of the relay SR1b following its previous energization, the relay R2 remains locked up through its holding circuit controlled by the contact 100 of relay SR1b, and relay R1 is prevented from energizing, until such time as relay SR1b releases, notwithstanding that relay R1 and not relay R2 should be energized under these circumstances.

It is contemplated that even under the most extreme conditions which will be encountered in practice, relay SR1b will be released prior to the instant when brush 86 electrically contacts brush 47b a second time while rotating clockwise relative thereto, so that relay R2 will be released due to opening of the contact 100 of relay SR1b during the first relative clockwise turn of the brush 86. This enables relay R1 to subsequently become energized and to lock up, when relay SR1b is again energized and closes its contact 100, and relay R2 is thereafter prevented from energizing so long as relay SR1b is in an operative condition. However, it may be desirable to provide an absolute safeguard against the possibility, remote as it may be, that the relays SR1b and R2 will be caused to assume an operative condition for correcting low relative velocity of the propeller P2, and that the relative velocity of the propeller P2 may then increase at such a rate that brush 86 repeatedly contacts brush 47b, with sufficient rapidity to maintain the relay SR1b in a continuously operative condition, thereby holding the relay R2 in its locked-up condition and preventing the relay R1 from energizing. Because of this, I have provided a form of my invention, as illustrated in Fig. 20, which positively insures against the occurrence of an improper condition as just described.

Figure 20:
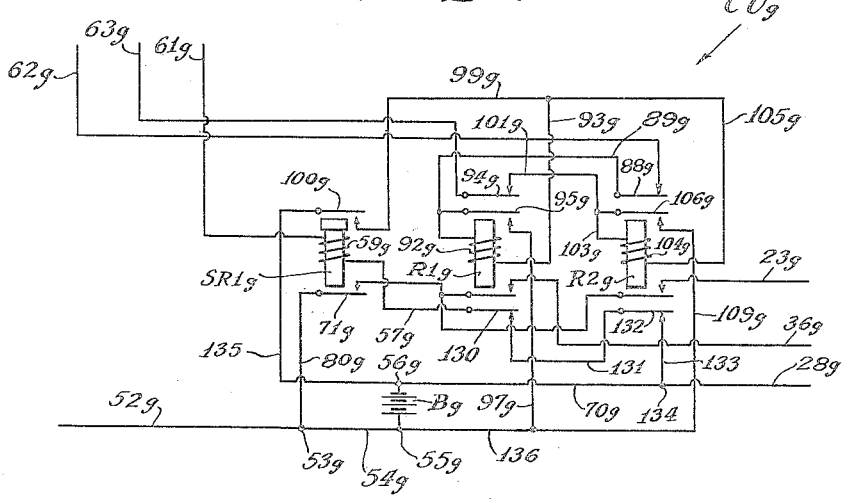
Figs. 20 and 21 are diagrammatic views of two modifications each similar to that shown in Figs. 9 to 11.

The control unit CUg shown in Fig. 20, is similar in many respects to the control unit CUb, Fig. 11, and is adapted to be operated under the control of a commutator switch as S2b, Fig. 10. In the present instance, however, the conductor 57g leading from the winding 59g of the relay SR1g is not connected directly to the source of voltage Bg but leads to one terminal of the contact 130 of the relay R1g. The contact 130 is normally closed when relay R1g is deenergized and serves to connect the conductor 57g with a conductor 131 that leads to one terminal of a like contact 132 of the relay R2g, which contact normally connects the conductor 131 to a conductor 133 leading to a terminal 134, and thence circuit is completed through the conductor 70g to the terminal 50g of the voltage source Bg. Whenever a relay as R1g or R2g is energized, however, the energizing circuit for the winding 59g of the relay SR1g is broken due to the opening of either of the contacts 130 or 132. Hence, if as in the above described example of operation, relay R2g is energized while the relay SR1g is in an operative condition, such as would occur when there is counterclockwise relative rotation of the brushes of the switch as S2b, Fig. 10, the contact 132 remains open so long as relay R2g is held locked up through its holding circuit, which is to say, so long as relay SR1g remains in an operative condition. Then, if the sense of relative rotation of the brushes should be suddenly reversed, and as brush 47b, Fig. 9, moves into electrical contact with the brush as 86, the relay SR1g will nevertheless continue to deenergize and will subsequently be released to thereby break the holding circuit to the relay R2g regardless of how long or how often the brush as 86 is in electrical contact with the master brush as 47b when there is relative clockwise rotation of the brushes as 86. When relay R2g has been released to close its contact 132, the energizing circuit for the relay SR1g is again conditioned for operation and thereafter the relay SR1g and then the relay R1g may become energized to bring about the necessary control operation for correcting the high relative speed of the propeller as P2, Fig. 1.

To afford still further reliability of operation, the conductors 93g and 105g leading from the windings 92g and 104g, respectively, of the relays R1g and R2g have been connected to the conductor 99g which leads to one terminal of the normally open contact 100g of the relay SR1g, the other terminal of this contact being connected by a conductor 135 to the terminal 56g of the voltage source Bg. The conductors 97g and 109g leading from corresponding terminals of the normally open holding-circuit contacts 95g and 106g of the relays R1g and R2g, respectively, are connected to a conductor 136 leading to the terminal 55g of the voltage source Bg. This arrangement insures that neither the relay R1g nor the relay R2g can be energized so long as the relay SR1g is in an inoperative condition, and hence, all control operations must begin with the operation of relay SR1g.

For example, if upon initiation of counterclockwise relative rotation of the brushes of the switch as S2b, Fig. 10, the master brush as 47b should first be brought into electrical contact with the brush as 85, the relay R1g will not be energized inasmuch as the energizing circuit through its winding 92g cannot be completed until the contact 100g of relay SR1g is closed, which is to say, until relay SR1g is energized to assume an operative condition. If, however, the relay SR1g becomes energized upon subsequent contacting of the brush as 86 with the master brush as 47b, and while SR1g is maintaining its contact 100g closed the brush as 87 should electrically contact the master brush as 47b, circuit from the voltage source Bg is extended through the brushes as 47b and 87, conductor 63g, closed contact 94g of the deenergized relay R1g, and conductors 101g and 103g to the winding 104g of relay R2g, and thence through conductors 105g and 99g, closed contact 100g of the relay SR1g, and conductor 135 back to the voltage source Bg. Relay R2g thereupon energizes and closes its contact 106g to thereby establish a holding circuit from the terminal 55g of the source Bg through the conductors 136 and 109, contact 106g, and condutcor 103g to the winding 104g, which holding circuit continues through the contact 100g of relay SR1g as just described, so long as relay SR1g maintains its contact closed. Energization of the relay R2g opens the contact 88g to thereby prevent the relay R1g from energizing, as in the embodiment shown in Fig. 11, and also opens the contact 132 which is effective as aforesaid to prevent the relay SR1g from being subsequently energized until it has first assumed an intervening inoperative condition.

It will be appreciated from the foregoing that relay SR1g cannot remain operative for more than a predetermined time following each energization thereof, unless it should so happen that a condition of substantial synchronism is attained while the brushes as 47b and 86 are in electrical contact. Therefore, irrespective of how great the magnitude of the relative velocity of the propellers as P1 and P2 may be, the relay SR1g cannot remain in a continuously operative condition and hence even at high relative velocities, the control unit CUg may furnish a series of control impulses to the motor as M, Fig. 2, although the amount of overlap in the release time of the relay SR1g following the subsequent energization and locking up of a relay as R1g or R2g will vary in accordance with the magnitude of such relative rotation as in the case of the control unit CUb, Fig. 11.

Figure 21:
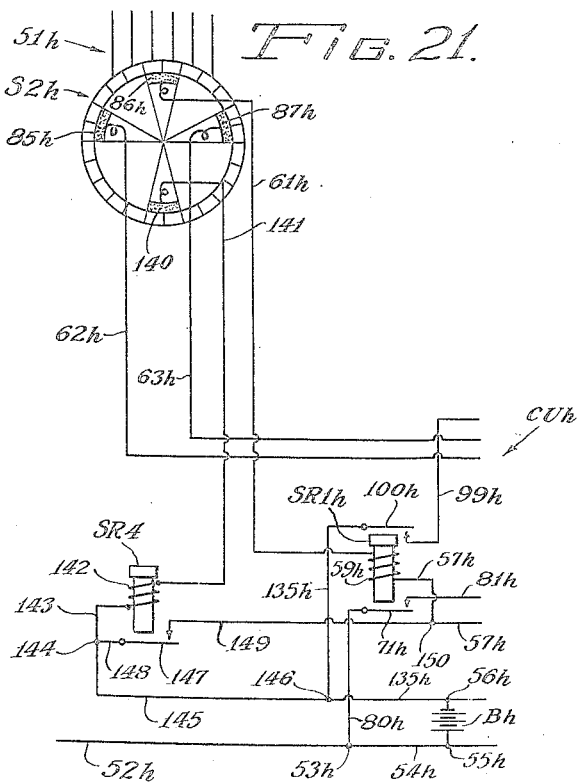

It may be desirable to eliminate the pulsing control afforded by the control unit CUg, Fig. 20, at high relative speeds of the propellers without affecting the pulsing control at lower speed differentials, which, as has been explained hereinabove, aids to prevent hunting when the propellers are being brought into substantial synchronism. To this end, I have shown in Fig. 21 a modification of the circuit arrangement disclosed in Fig. 20. This modification consists of incorporating the slow-to-release relay SR4 in the circuit for maintaining the connection from the terminal 56h of the voltage source Bh to the winding 59h of the slow-to-release relay SR1h continuously closed at high relative speeds. It will be understood that the control unit CUh, which is fragmentarily shown in Fig. 21, is identical in all respects with the control unit CUg, except for the addition of the relay SR4, like parts bearing similar reference numbers differing only in the suffix added thereto.

The control unit CUh is under the control of a commutator switch S2h that is similar in construction to the switch S2b, Fig. 10, except that a fourth brush 140 is added to the rotor assembly, this brush being preferably located diametrically opposite the brush 86h which controls the relay SR1h. When the brush 140 is brought into electrical contact with the master brush as 47b, Fig. 9, circuit is completed from the voltage source Bh through said master brush and the brush 140, Fig. 21, to the conductor 141 that leads to one end of the winding 142 of the slow-to-release relay SR4, thence through conductor 143, terminal 144, and conductor 145 to a terminal 146 which is included in the conductor 135h leading back to the voltage source Bh. Relay SR4 thereupon energizes and closes its normally open contact 147 to thereby establish an electric connection from the terminal 144 and conductor 148 to the conductor 149 which leads to the terminal 150 that is included in the conductor 57h connected to the end of the winding 59h of relay SR1h opposite the end of this winding electrically connected to the brush 86h. Relay SR4 has a slow-to-release time such that battery will always be available to the winding 59h of the relay SR1h when the master brush as 47b, Fig. 9, makes electrical contact with brush 140, Fig. 21, at a rate greater than a predetermined value. Thus when the relative speed of the propellers rises above a predetermined value, the relays as R1g and R2g, Fig. 20, are no longer effective when energized to break the electrical connection from the winding 59h of the relay SR1h, Fig. 21, to the terminal 56h of the source of current Bh, for under these circumstances the relay SR4 will remain operative for a period long enough for the circuit to brush 86h to be conditioned for operation when brush 47h electrically contacts brush 86h, which in effect, restores the winding 59h to continuous electrical contact with the terminal 56h of the source Bh.

At low relative speeds of the propellers, below a certain value determined by the release time of relay SR4, the relay SR4 will never be in an operative condition at any time while the master brush as 47b, Fig. 9, is in electrical contact with the brush 86h, Fig. 21. Nevertheless the relative speed may still be great enough so that the slow-to-release relay SR1h would tend to remain continuously energized, neglecting for the moment the effect of a contact as 130 or 132 of a relay as R1g or R2g, Fig. 20, upon the operation of the relay SR1h, Fig. 21, inasmuch as the relay SR1h preferably has a longer release time than the relay SR4. However, as has been described hereinabove in connection with Fig. 20, the operation of these contacts is such that unless the connection from the winding 59h of the relay SR1h to the terminal 56h of the voltage source Bh is maintained by the slow-to-release relay SR4, the energizing circuit to the relay SR1h cannot be established so long as either of the relays as R1g or R2g is being held locked up under control of the contact 100h of the relay SR1h, so that under these circumstances the control unit CUh furnishes a series of control impulses to the motor as M, Fig. 2. As the relative speed of the propellers decreases still further, the frequency of these control impulses becomes correspondingly smaller, as does also the period during which there is overlap in the operative conditions of the relay SR1h and the relay as R1g or R2g, Fig. 20. Hence, at comparatively low speed differentials the operation of the control unit CUh is substantially the same as that of the unit CUb, Fig. 11.

It is believed apparent from the foregoing description of my invention that I have provided means for correlating the operation of relatively movable parts of machinery or the like, particularly on aircraft, under widely varying conditions and for a variety of purposes. It is to be understood, however, that my invention is not limited to use on aircraft for it may be employed in other applications, for example, in controlling the screw propellers of ships or in governing the relative speeds of drive shafts on stationary machinery. It will furthermore be appreciated that although the substantial synchronization of relatively movable machine parts has an important application, my invention could be utilized for correlating the operations of such parts in a manner other than by synchronizing them, for instance by maintaining a fixed ratio between their speeds of operation. Furthermore, the control unit may effect operation of an indicating means such as the lamps in Fig. 3.

In the illustrated embodiments of my invention a certain small amount of relative rotation between the propellers as P1 and P2, Fig. 1, is permitted by the apparatus but if the average relative velocity exceeds a predetermined limit determined by the time factor introduced by devices such as the slow-to-release relays, a control operation is brought about which results in the substantial synchronization of the propellers.

Moreover, when the relative velocity is greater than said predetermined limit, the motor such as M, Figs. 1 and 2, which controls the speed of an engine as E2, may be either continuously or repeatedly energized, depending upon the magnitude of such relative rotation, to quickly restore the engines as E1 and E2 into substantial synchronism, but when the condition of substantial synchronism is being approached, the motor M is intermittently energized less frequently and each time for a shorter interval so that the speed of the engine as E2 is gradually brought within the allowable range without danger of hunting.

A regulating means such as a motor M may be conveniently employed to vary the pitch of a variable pitch propeller for adjusting the engine speed but this objective may be expeditiously accomplished in other ways, such as controlling the fuel supply to the engine.

Figure 18:
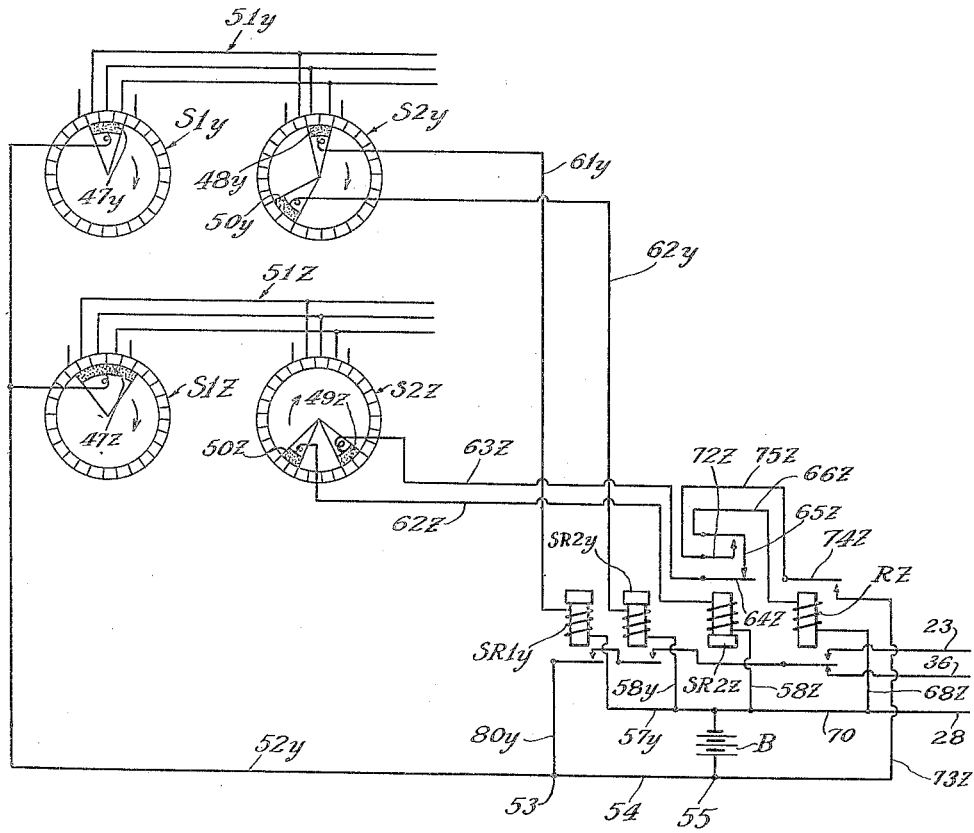
Fig. 18 is a wiring diagram of an embodiment in which the brushes for determining direction of relative rotation are driven independently of the brushes for effecting control when the magnitude of such relative rotation exceeds predetermined limits.

In the main embodiments of my invention the control unit such as CU, Fig. 5, is compactly arranged and has a minimum number of working parts for determining the sense of relative rotation and for ascertaining when the magnitude of such relative rotation of the relatively rotatable members, such as propellers for example, exceeds a predetermined amount, but if it is desired for any reason to secure an even greater reliability of operation than that which is afforded by such arrangements, the parts may be arranged so that the relative direction-determining means has a different response to a variation from normal operating conditions of the engines E1 and E2 than does the means responsive to the magnitude of such variation, an arrangement illustrative of the foregoing being shown in Fig. 18.

Furthermore, I have contemplated the possibility that the number of conductors required in the cables as 51, Fig. 1, may become somewhat large and with this in view, I have provided an arrangement as shown in Fig. 19 which may be employed under certain conditions to greatly reduce the number of such conductors required if the occasion should demand.

Slow-to-release relays afford a convenient means of providing time factors to enable, for instance, energizing circuits to be established when such relays are sequentially energized at a predetermined rate, but it is to be understood that such time factors could be obtained by resorting to other means such as slow-to-energize relays, dash pots, or the like.

Thus while I have illustrated and described selected embodiments of my invention it is to be understood that they are capable of variation and modification and I, therefore, do not wish to be limited to the precise details set forth but desire to avail myself of such changes and alterations as fall within the purview of the following claims.

I claim:

1. In an apparatus for establishing and maintaining a predetermined interrelation in the speeds of operation of at least two engines each of which drives a propeller and of which the speed of operation of one selected engine is to be determinative of the speed of operation to be established and maintained, means associated with each engine other than said one engine and operative in two directions to regulate the pitch of the propeller to thereby regulate the speed of operation of the engine with which it is associated, control means for each regulating means including a plurality of relays at least one of which is a slow-to-release relay, said control means being effective when operative to render operative the regulating means controlled thereby and two of said relays cooperating to determine the direction of operation of said regulating means, and detecting means including switch means associated with each engine and controlling said relays in response to variations in the speed of operation of an engine other than said one engine with respect to the speed of operation of said one engine to render operative the control means for the regulating means associated with the engine of which the speed of operation is at a variance with the speed of operation of said one engine to thereby render such regulating means operative in the required direction when such variation exceeds a predetermined amount to correct the variance in the speed of operation of the engine of which the speed of operation is at a variance with the speed of operation of said one engine.

2. In an apparatus for establishing and maintaining an operative interrelation in the operation of at least two otherwise independently operative devices of which the operative condition of one device is determinative of the operative condition to be established and maintained, electrically operable means associated with each device other than said one device and operative to regulate the operation of the device with which it is associated, a control unit for each regulating means and including at least two relays at least one of which is slow-to-release whereby said relays may be rendered operative concurrently, said relays being effective when concurrently operative to render operative the regulating means controlled thereby, and detecting means including electrical circuit-closing means associated with each operative device and operative in response to variations in the operative condition of a device other than said one device with respect to the operative condition of said one device to successively and cyclically energize the relays included in the control unit for the regulating means associated with the device of which the operative condition is at a variance with the operative condition of said one device, said relays being alternately energized by said circuit-closing means with a time interval between energizations determined by the magnitude of the variation, to thereby render the regulating means operative to correct the variance in the operative condition of the device of which the operating condition is at variance with the operative condition of said one device whenever said relays are caused to assume a concurrently operative state.

3. In an apparatus for establishing and maintaining a predetermined interrelation in the speeds of operation of at least two otherwise independently operative devices of which the speed of operation of a predetermined one of said devices is determinative of the speed of operation to be established and maintained, electrically operable means associated with each device other than said one device and operative to regulate the speed of operation of the device with which it is associated, a control unit for each regulating means and including at least two relays at least one of which is slow-to-release whereby said relays may be rendered operative concurrently, said relays being effective when concurrently operative to render operative the regulating means controlled thereby, and detecting means including electrical circuit-closing means associated with each operative device and operative in response to variations in the speed of operation of a device other than said one device with respect to the speed of operation of said one device to successively and cyclically energize the relays included in the control unit for the regulating means associated with the device of which the speed of operation is at a variance with the speed of operation of said one device, said relays being energized successively and cyclically by said circuit-closing means with a time interval between energizations determined by the magnitude of the variation, to thereby render the regulating means operative to correct the variance in the speed of operation of the device of which the speed of operation is at variance with the speed of operation of said one device whenever said relays are caused to assume a concurrently operative state.

4. In an apparatus for establishing and maintaining a predetermined interrelation in the speeds of operation of at least two engines each of which drives a propeller and of which the speed of operation of one engine is to be determinative of the speed of operation to be established and maintained, electrically operated means associated with each engine other than said one engine and operative in two directions to regulate the pitch of the propeller to thereby regulate the speed of operation of the engine with which it is associated, a control unit for each regulating means and including at least two relays at least one of which is slow-to-release whereby said relays may be rendered operative concurrently, said relays being effective when concurrently operative to render operative the regulating means controlled thereby, detecting means including electrical circuit-closing means associated with each engine and operative in response to variations in the speed of operation of an engine other than said one engine with respect to the speed of operation of said one engine to successively and cyclically energize the relays included in the control unit for the regulating means associated with the engine of which the speed of operation is at a variance with the speed of operation of said one engine, said relays being energized successively and cyclically by said circuit-closing means with a time interval between energizations determined by the magnitude of the variation, to thereby render the regulating means operative to correct the variance in the speed of operation of the engine of which the speed of operation is at a variance with the speed of operation of said one engine whenever said relays are caused to assume a concurrently operative state, means operable to determine the direction of operation of said regulating means.

5. In an apparatus for establishing and maintaining an operative interrelation in the operation of at least two otherwise independently operative devices of which the operative condition of one selected device is determinative of the operative condition to be established and maintained, electrically operable means associated with each device other than said one device and operative to regulate the operation of the device with which it is associated, an electrically operated unit for each regulating means and effective when operative to render operative the regulating means controlled thereby, and detecting means including sets of correspondingly positioned contacts and wherein each set of contacts is associated with an operative device as aforesaid, a circuit-closing means for each set of contacts, means for effecting relative movement between each set of contacts and the circuit-closing means therefor in response to the operation of the operative device with which the set of contacts and the circuit-closing means are associated, and means interconnecting the contacts in the set of contacts associated with said one device respectively with correspondingly positioned contacts in the sets of contacts associated with each other device, each set of contacts associated with each operative device other than said one device respectively controlling circuit to the control unit for the regulating means associated with the operative device with which such set of contacts is associated, the circuit arrangements in said detecting means being such that when the circuit-closing means engageable with the contacts associated with said one device engages a contact interconnected with a contact in another set that is engaged by the circuit-closing means for such set circuit is conditioned to the control unit to which the contacts in such other set pertain, said detecting means being so arranged that an electrical circuit is conditioned as aforesaid when the operative condition of the operative device with which the aforesaid other set of contacts is associated is at a variance with the operative condition of said one operative device, the conditioning of an electrical circuit as aforesaid rendering effective the control unit to thereby render effective the regulating means for the operative device of which the operative condition is at a variance with the operative condition of said one device to thus render such regulating means operative to correct the variance in the operative condition of the device of which the operating condition is at variance with the operative condition of said one device.

6. In an apparatus for establishing and maintaining an operative interrelation in the operation of two otherwise independently operative devices of which the operative condition of one selected device is determinative of the operative condition to be established and maintained, electrically operable means associated with the other of said devices and operative to regulate the operation of the device with which it is associated, an electrically operated control unit effective when operative to render operative said regulating means, and detecting means including a set of circularly arranged contacts stationarily mounted in association with said one operative device, a rotatable brush cooperating with said set of contacts, another set of circularly arranged contacts stationarily mounted in association with said other operative device, at least two circumferentially spaced rotatable brushes cooperating with said other set of contacts, means for rotatively driving the several brushes in response to the respective operations of the operative devices with which the brushes are associated, conductors interconnecting the contacts in the set of contacts associated with said one device respectively with correspondingly positioned contacts in the set of contacts associated with said other device, and circuit means operatively connecting said electrically operated control unit in controlled relation to said at least two spaced brushes, the circuit arrangements in said detecting means being such that when the brush engageable with the contacts associated with said one device successively engages contacts that are respectively interconnected with contacts in said other set that are engaged by the brushes for such set to thereby establish electrical contacts alternately between said brush and said at least two spaced brushes in response to at least a predetermined variance in the operative conditions of said devices, said control unit is thereby operated to render effective the regulating means for the operative device of which the operative condition is at a variance with the operative condition of said one device to thus render such regulating means operative to correct the variance in the operative condition of the device of which the operating condition is at variance with the operative condition of said one device.

7. In an apparatus for establishing and maintaining a predetermined interrelation in the speeds of operation of two otherwise independently operative engines of which the speed of one selected engine is to be determinative of the speed to be established and maintained, electrically operable means associated with the other of said engines and operative to regulate the speed of operation of the engine with which it is associated to either increase or decrease said speed, an electrically operated control unit effective when operative to render operative said regulating means, detecting means including a set of circularly arranged contacts stationarily mounted in association with said one engine, a rotatable brush cooperating with said set of contacts, another set of circularly arranged contacts stationarily mounted in association with said other engine, at least two circumferentially spaced rotatable brushes cooperating with said other set of contacts, means for rotatively driving the several brushes in response to the respective speeds of the engines with which the brushes are associated, conductors interconnecting the contacts in the set of contacts associated with said one engine respectively with correspondingly positioned contacts in the set of contacts associated with said other engine, and circuit means operatively connecting said electrically operated control unit in controlled relation to said at least two spaced brushes, the circuit arrangements in said detecting means being such that when the brush engageable with the contacts associated with said one engine successively engages contacts that are respectively interconnected with contacts in said other set that are engaged by the brushes for such set to thereby establish electrical contacts alternately between said brush and said at least two spaced brushes in response to at least a predetermined variance in the speeds of operation of said engines, said control unit is thereby operated to render effective the regulating means for the engine of which the speed of operation is at a variance with the speed of operation of said one engine to thus render such regulating means operative to correct the variance in the speed of operation of the engine of which the speed of operation is at variance with the speed of operation of said one engine, and means operatively associated with said electrically operable means and operable to determine whether such correction is to increase or decrease the engine speed of the engine to which the correction is to be applied.

8. In an apparatus for correlating the operation of otherwise independently operable devices, means for selectively controlling the speed of operation of a selected one of said devices, means adjustable to alternative relations for conditioning said control means to alternatively increase or decrease the speed of operation of said one device, a pair of operable members at least one of which is capable when rendered operative of remaining in such operative condition for at least a predetermined period and said members being effective when in a concurrently operative condition to operate said speed controlling means according to the sense in which it has been conditioned by said conditioning means, and means responsive to a variation from a predetermined relation in the speeds of operation of said one device and another of said devices for adjusting said conditioning means to one or the other of its alternative relations according to the sense of such variation and effective to alternately operate said members with a time-interval between energizations dependent upon the magnitude of such variation.

9. In an apparatus for controlling the speed of one engine relative to that of an associated engine, the combination of regulating means operable to vary the speed of said one engine to increase or decrease such speed, a pair of control members at least one of which is capable when rendered operative of remaining in such operative condition for at least a predetermined time and the other of which is adapted when rendered operative while said one member is in its operative state to remain operative throughout at least the balance of the operative period of said one member and said members being effective during the overlap in the operative periods of each to actuate said regulating means for varying the speed of said one engine, and detecting means operating in response to a difference in speeds of said engines for successively and cyclically rendering said members operative with a time interval between energizations determined by the magnitude of such difference in speeds whereby there are overlap times in the operative periods of said control members during which said regulating means is actuated to vary the speed of said one engine toward substantial synchronism with that of the associated engine and which become gradually less frequent and of shorter duration as a state of substantial synchronization is being approached, and means operatively associated with said regulating means and operable to determine whether the speed is to be increased or decreased.

10. In a control apparatus for correlating the rotative speeds of relatively rotatable elements such as independently driven propellers on aircraft and the like, the combination, with a plurality of engines or the like for respectively driving said elements, of a corresponding plurality of detecting switches one for each of said engines or the like and each including a stationary part and a relatively movable part driven rotatively by its associated engine or the like, one of said parts consisting of a commutator and the other of said parts comprising one or more brushes cooperating with such commutator and said movable parts of said switches being normally driven in substantial synchronism with each other, circuits connecting corresponding segments of said commutators, means for adjusting the speed of one of said engines or the like in two directions relative to the speed of another or master engine or the like, control means including an element having a time delay factor effective in response to the rapidity with which electrical contacts are successively established between brushes of the switches associated with said master engine or the like and said other engine or the like, when there is a variation from a predetermined relation in the rotative speeds of said elements causing said movable switch parts to rotate substantially out of synchronism with each other, to operate said adjusting means for varying the speed of said one engine or the like to restore said predetermined relation in speeds, and means operable in response to the sequence of such electrical contacts to determine the direction of operation of said adjusting means.

11. In a control apparatus for maintaining at least one variable pitch propeller in timed relation with another or master propeller on aircraft and the like, the combination, with a plurality of engines for respectively driving said propellers, of a commutator switch for the master engine and including a master brush driven in substantial synchronism therewith, another commutator switch having at least two brushes circumferentially spaced in an amount greater than the width of said master brush and driven in substantial synchronism with another of said engines, circuits connecting corresponding commutator segments of said switches, means for adjusting the speed of said other engine by varying in either of two directions the pitch of the propeller driven thereby, a pair of slow-to-release relays each electrically connected to a corresponding one of said two brushes and effective when one is energized while the other is in an operative condition to operate said propeller pitch-varying means whereby the occurrence of greater than a predetermined variation in speed of said at least one variable pitch propeller relative to said master propeller causes the pitch of said one propeller to be varied for bringing its engine into substantial synchronism with the engine of said master propeller, and means operable to determine the direction of operation of said adjusting means.

12. In a control apparatus for maintaining propellers on aircraft or the like in timed relation with an associated master propeller, detecting switches one for each of said propellers and each comprising a stationary commutator and one or more circumferentially spaced cooperating brushes driven rotatively in substantial synchronism with the corresponding propeller, circuits connecting corresponding commutator segments of said switches, reversibly operable means for varying the speed of the first-named propeller with respect to said master propeller, means for controlling said last mentioned means for causing forward or reverse operation thereof, means effective in response to the sequence in which electrical contacts are successively established between the brushes of said switches during relative rotations of said propellers to condition said controlling means for operation in either a forward or a reverse direction, and means under control of said switches and operating according to the magnitude of such relative rotative speeds of said propellers to actuate said speed-varying means in the direction in which it has been conditioned for thereby bringing said propellers into substantial synchronism.

ROSSER L. WILSON.